US012779760B2

(12) United States Patent
Taruno et al.

(10) Patent No.: US 12,779,760 B2
(45) Date of Patent: Nov. 3, 2026

(54) CONTAINER MANUFACTURING METHOD, DOUBLE CONTAINER MANUFACTURING METHOD, DOUBLE CONTAINER, AND METHOD FOR DISCHARGING CONTENTS FROM DOUBLE CONTAINER

(71) Applicant: KYORAKU CO., LTD., Kyoto (JP)

(72) Inventors: Shinsuke Taruno, Yamato (JP); Yosuke Muroya, Yamato (JP); Takafumi Suenaga, Yamato (JP); Ippei Ohmura, Yamato (JP); Kentaro Kunimori, Yamato (JP)

(73) Assignee: KYORAKU CO., LTD, Kyoto (JP)

( * ) Notice: Subject to any disclaimer, the term of this patent is extended or adjusted under 35 U.S.C. 154(b) by 47 days.

(21) Appl. No.: 18/998,623

(22) PCT Filed: Jul. 24, 2023

(86) PCT No.: PCT/JP2023/026976
§ 371 (c)(1),
(2) Date: Jan. 27, 2025

(87) PCT Pub. No.: WO2024/024715
PCT Pub. Date: Feb. 1, 2024

(65) Prior Publication Data

US 2026/0077551 A1 Mar. 19, 2026

(30) Foreign Application Priority Data

Jul. 27, 2022 (JP) ................................ 2022-119690
Jul. 27, 2022 (JP) ................................ 2022-119692
(Continued)

(51) Int. Cl.
*B29C 49/22* (2006.01)
*B29C 49/00* (2006.01)
(Continued)

(52) U.S. Cl.
CPC ........... *B29C 49/08* (2013.01); *B29C 49/071* (2022.05); *B65D 1/0246* (2013.01);
(Continued)

(58) Field of Classification Search
CPC ..... B29C 49/08; B29C 49/22; B29C 2949/08; B29C 2949/0821
(Continued)

(56) References Cited

U.S. PATENT DOCUMENTS

2005/0199577 A1 9/2005 Tokuda et al.
2023/0182961 A1* 6/2023 Eguchi .................... B65D 1/02 220/495.11
(Continued)

FOREIGN PATENT DOCUMENTS

CN 216301759 U 4/2022
JP S5228562 A 3/1977
(Continued)

OTHER PUBLICATIONS

Translation of JP 2003191318 A (published on Jul. 8, 2003).*
International Search Report issued on Oct. 10, 2023, in corresponding International Application No. PCT/JP2023/026976; 8 pages.
Office Action issued on Feb. 3, 2026 in corresponding Japanese Application No. 2022-119694, 8 pages.
Office Action issued on Feb. 3, 2026 in corresponding Japanese Application No. 2022-119696, 8 pages.
Office Action issued on Feb. 3, 2026 in corresponding Japanese Application No. 2022-119698, 6 pages.
(Continued)

*Primary Examiner* — Leo B Tentoni
(74) *Attorney, Agent, or Firm* — Maier & Maier, PLLC

(57) ABSTRACT

The present invention provides a method for manufacturing a container, in which the occurrence of tears at a part corresponding to the sealing part of a preform is preventable during manufacture of the container by performing biaxial stretch blow molding on the preform formed by direct blow molding. The present invention provides a method for manufacturing a container, comprising a step of manufacturing a container main body by performing biaxial stretch blow molding on a preform, wherein the preform includes a direct blow molded body formed by performing direct blow molding on a molten tubular parison, and the direct blow
(Continued)

molded body is provided with a protruding sealing part in which a sealing part, formed by welding inner surfaces of the tubular parison to each other, protrudes from a main body part of the direct blow molded body.

19 Claims, 31 Drawing Sheets

(30) Foreign Application Priority Data

Jul. 27, 2022 (JP) ................................ 2022-119694
Jul. 27, 2022 (JP) ................................ 2022-119696
Jul. 27, 2022 (JP) ................................ 2022-119698
Aug. 19, 2022 (JP) ................................ 2022-131282

(51) Int. Cl.
*B29C 49/08* (2006.01)
*B65D 1/02* (2006.01)
*B29L 31/00* (2006.01)

(52) U.S. Cl.
CPC .... *B65D 1/0276* (2013.01); *B29C 2949/0744* (2022.05); *B29C 2949/08* (2022.05); *B29C 2949/0821* (2022.05); *B29C 2949/0827* (2022.05); *B29L 2031/7158* (2013.01)

(58) Field of Classification Search
USPC ........................................ 264/512, 532, 534
See application file for complete search history.

(56) References Cited

U.S. PATENT DOCUMENTS

| | | | |
|---|---|---|---|
| 2023/0364847 | A1 | 11/2023 | Kurahashi et al. |
| 2025/0002217 | A1 | 1/2025 | Eguchi |
| 2025/0319642 | A1 | 10/2025 | Kurahashi et al. |

FOREIGN PATENT DOCUMENTS

| | | | | | |
|---|---|---|---|---|---|
| JP | H1158502 | A | | 3/1999 | |
| JP | 2003191318 | A | | 7/2003 | |
| JP | 2015101396 | A | | 6/2015 | |
| JP | 2019010741 | A | | 1/2019 | |
| JP | 2019131254 | A | | 8/2019 | |
| JP | 2021070489 | A | | 5/2021 | |
| JP | 2021187466 | A | | 12/2021 | |
| JP | 2022031522 | A | | 2/2022 | |
| JP | 2022033890 | A | | 3/2022 | |
| JP | 2022051111 | A | | 3/2022 | |
| JP | 2023161981 | A | | 11/2023 | |
| KR | 20050061398 | A | | 6/2005 | |
| WO | WO-2022059715 | A1 | * | 3/2022 | ............... B65D 1/02 |

OTHER PUBLICATIONS

Extended Search Report issued on Nov. 3, 2025, in corresponding European Application No. 23846445.7, 14 pages.

* cited by examiner

CONTAINER MANUFACTURING METHOD, DOUBLE CONTAINER MANUFACTURING METHOD, DOUBLE CONTAINER, AND METHOD FOR DISCHARGING CONTENTS FROM DOUBLE CONTAINER

TECHNICAL FIELD

The present invention pertains to a container manufacturing method, double container manufacturing method, double container, and method for discharging contents from a double container.

BACKGROUND ART

First to Fourth and Tenth Perspectives

Patent Literature 1 discloses a method for manufacturing a container, which includes a step of performing biaxial stretch blow molding on a preform to manufacture the container main body.

Sixth and Seventh Perspectives

Conventionally, a double container that includes a container main body having an outer shell and an inner bag is known. For example, Patent Literature 2 discloses a double container formed by performing biaxial stretch blow molding on an outer shell preform and an inner bag preform that are stacked with each other.

Eight Perspective

Conventionally, a double container that includes a container main body having an outer shell and an inner bag is known. For example, Patent Literature 2 discloses a double container formed by performing biaxial stretch blow molding on an outer shell preform and an inner bag preform that are stacked with each other.

Fifth Perspective

Conventionally, a double container that includes a container main body having an outer shell and an inner bag is known. For example, Patent Literature 2 discloses a method for manufacturing a double container, which includes a step of performing biaxial stretch blow molding on a preform formed by covering an inner preform with an outer preform, to manufacture a container main body having an inner bag and an outer shell that covers the inner bag.

Ninth Perspective

Conventionally, a double container that includes a container main body having an outer shell and an inner bag is known. For example, Patent Literature 1 discloses a double container formed by performing biaxial stretch blow molding on an outer shell preform and an inner bag preform that are stacked with each other.

CITATION LIST

Patent Literature

Patent Literature 1: JPA2022-31522
Patent Literature 2: JPA2019-10741

SUMMARY OF THE INVENTION

Technical Problem

First to Fourth and Tenth Perspectives

In Patent Literature 1, the preform is formed by injection molding. When forming a preform by injection molding, it is difficult to make the preform into a multi-layer structure with three or more layers. In order to solve such a problem, preforms could be manufactured by direct blow molding, which makes it easy to manufacture preforms with a multi-layer structure. However, in a preform formed by direct blow molding, a sealing part is inevitably formed as inner surfaces of a tubular parison are welded together at a pinch-off part. Since the strength of the sealing part is weaker than that of other parts, performing a biaxial stretch blow molding on a preform having a sealing part risks tearing the sealing part as the sealing part is stretched.

The present invention has been created in consideration of the above circumstances to provide a method for manufacturing a container, in which tears in parts corresponding to the sealing part of a preform are preventable while the container is manufactured by performing biaxial stretch blow molding on the preform formed by direct blow molding.

Sixth and Seventh Perspectives

It is desirable to separate the outer shell and the inner bag when recycling such a double container if the outer shell and inner bag are made of different materials, or if the inner bag has residues sticking inside after use.

The outer shell and the inner bag are assumed to be separated by pulling the inner bag out of the container main body, and it is desirable to make it easier to pull the inner bag out of the container main body.

The present invention has been created in consideration of the above circumstances to provide a double container in which the inner bag is easily pulled out from the container main body.

Eighth Perspective

In such a double container, it is desirable that all of the contents inside the inner bag are consumable or that the amount of contents left inside that are no longer dischargeable (hereinafter, the "final residual amount") is reduced as much as possible.

The present invention has been created in consideration of the above circumstances to provide a method for discharging the contents in a double container, in which the final residual amount of the contents is reducible.

Fifth Perspective

The mouth part of the inner preform could include an engaging part for pulling out the inner bag from the container main body, and the pulling out could be performed by engaging a member, such as a cap, with the engaging part. In this case, the mouth part of the inner bag desirably has high rigidity.

On the other hand, in the case where an inner preform is formed by direct blow molding as in Patent Literature 2, it is difficult to increase the wall thickness of only the mouth part of the inner preform. If the trunk part or the bottom part of the inner preform is thinned in order to thin the inner bag, the wall thickness of the mouth part of the inner preform also becomes smaller, and the rigidity of the mouth part of the inner preform becomes insufficient. As a result, the rigidity of the mouth part of the inner bag becomes insufficient, which may cause problems in pulling out the inner bag. This problem is particularly noticeable when the blow ratio at the mouth part of the inner preform is 1.5 or more.

The present invention has been created in consideration of the above circumstances to provide a method for manufacturing a double container that allows the inner bag to be smoothly pulled out, even if the double container is manufactured by performing biaxial stretch blow molding on an inner preform formed by direct blow molding.

Ninth Perspective

It is desirable to separate the outer shell and the inner bag when recycling a double container in the case where the outer shell and the inner bag of such a double container are made of different materials and/or the inner bag has residues sticking inside after use.

The outer shell and the inner bag are assumed to be separated by pulling out the inner bag from the container main body, and it is desired that the inner bag is easily pulled out from the container main body.

The present invention has been created in consideration of the above circumstances to provide a double container that makes it easy to pull out the inner bag from the container main body.

Solution to Problem

1st to 4th and 10th Perspectives

According to the present perspectives, the following aspects are provided.

(1) A method for manufacturing a container, comprising a step of manufacturing a container main body by performing biaxial stretch blow molding on a preform, wherein the preform includes a direct blow molded body formed by performing direct blow molding on a molten tubular parison, and the direct blow molded body is provided with a protruding sealing part in which a sealing part, formed by welding inner surfaces of the tubular parison to each other, protrudes from a main body part of the direct blow molded body.

(2) The method of (1), wherein the preform is composed of the direct blow molded body.

(3) The method of (1) or (2), wherein the protruding sealing part includes an extension prevention structure.

(4) The method of (1), wherein the preform comprises an inner preform, being composed of the direct blow molded body, and an outer preform disposed to cover the inner preform, and the protruding sealing part includes an extension prevention structure.

(5) The method of (3) or (4), wherein the extension prevention structure is a bent structure in which the protruding sealing part is bent.

(6) The method of (5), wherein the bent structure is formed during the direct blow molding.

(7) The method of (5), wherein the bent structure is formed by bending the protruding sealing part after the direct blow molding.

(8) The method of (7), wherein the main body part of the inner preform includes a groove along the protruding sealing part.

(9) The method of (7) or (8), wherein the protruding sealing part includes a base part and an outer part in order from the main body part's side, and the outer part includes a part having a larger wall thickness than the base part.

(10) The method of (9), wherein the protruding sealing part is disposed over a bottom part of the main body part and a trunk part of the main body part, the outer part includes a thick wall part and a thin wall part having a smaller wall thickness than the thick wall part, and the thin wall part is disposed adjacent to a boundary between the bottom part and the trunk part.

(11) The method of (3) or (4), wherein the extension prevention structure is formed by reducing surface area of the protruding sealing part by remelting the protruding sealing part after the direct blow molding.

(12) The method of (11), wherein an aspect ratio, defined by a height of the protruding sealing part divided by a wall thickness of the protruding sealing part, is three or more before the remelting, and the aspect ratio is reduced by the remelting.

(13) The method of (11) or (12), wherein the main body part includes a groove along the protruding sealing part.

(14) The method of any one of (1) to (13), wherein the inner preform includes, in order from inside of the inner preform, an inner layer, a gas barrier layer, and an outer layer.

(15) A method for manufacturing a double container, comprising a step of producing a container main body having an inner bag and an outer shell covering the inner bag, by performing biaxial stretch blow molding on a preform having an inner preform and an outer preform disposed to cover the inner preform, wherein the inner preform is formed by performing direct blow molding on a molten tubular parison, a mouth part of the inner preform includes an engaging part for pulling out the inner bag from the container main body, and ratio of D2 to D1 is 0.35 or more, where D1 is largest outer diameter of the inner preform at the mouth part, D2 is an outer diameter of the inner preform at a height of 0.1H from a bottom part of the inner preform, and H is a total height of the inner preform.

(16) The method of (15), wherein the ratio of D2 to D1 is 0.5 or more.

(17) The method of (15) or (16), wherein the ratio of D2 to D3 is 1.4 or more, where D3 is an outer diameter of the tubular parison.

(18) The method of any one of (15) to (17), wherein the inner preform includes a protruding sealing part formed by welding inner surfaces of the tubular parison to each other and the protruding sealing part protrudes from a main body part of the inner preform, and the protruding sealing part is disposed over a bottom part of the main body part and a trunk part of the main body part.

(19) A method for manufacturing a double container, comprising a step of producing a container main body having an inner bag and an outer shell covering the inner bag, by performing biaxial stretch blow molding on a preform having an inner preform and an outer preform disposed to cover the inner preform, wherein the inner preform is formed by performing direct blow molding on a molten tubular parison, the inner bag includes a thin wall part with a wall thickness of 100 μm or less, and the inner preform is provided with an uneven shape or a lubricant on an outer surface of an area that includes a part corresponding to the thin wall part.

(20) The method of (19), wherein the uneven shape includes a random shape.

(21) The method of (19) or (20), wherein the uneven shape has an arithmetic mean roughness Ra of 1 to 200 μm.

In the present perspectives, the preform includes a direct blow molded body that is formed by direct blow molding using a molten tubular parison. This facilitates multi-layering of the preform. Further, the sealing part provided in the direct blow molded body becomes the protruding sealing part that protrudes from the main body part of the direct blow molded body. Hence, the strength of the sealing part is improved and the occurrence of tears is prevented.

Sixth to Seventh Perspectives

According to the present perspectives, the following aspects are provided.

(1) A double container, comprising a container main body and a mouth part attachment, wherein the container main body includes an inner bag and an outer shell disposed to cover the inner bag, the mouth part attachment is attached to a mouth part of the container main body by pushing-in, and the inner bag is configured to move in a direction of coming out of the container main body via rotation of the mouth part attachment with respect to the outer shell.

(2) The double container of (1), wherein the mouth part attachment is configured to allow the rotation while maintaining an engagement, formed when the mouth part attachment is attached to a mouth part of the container main body, between the mouth part attachment and the outer shell.

(3) The double container of (1) or (2), wherein the mouth part attachment is configured to allow the rotation without weakening an engagement force between the mouth part attachment and the outer shell prior to rotating the mouth part attachment with respect to the container main body.

(4) The double container of any one of (1) to (3), wherein the mouth part attachment is engaged with a mouth part of the inner bag by pushing-in in a circumferential direction and an axial direction, the inner bag is configured to rotate with respect to the outer shell as the mouth part attachment rotates, and the inner bag is configured to move in a direction of coming out of the container main body as the inner bag rotates due to an effect of a cam mechanism disposed between the inner bag and the outer shell.

(5) The double container of any one of (1) to (4), wherein the mouth part attachment rotates in a loosening direction of right-hand threads.

(6) The double container of any one of (1) to (5), wherein the mouth part attachment includes an inner plug and an overcap, the inner plug is engaged with a mouth part of the inner bag by pushing-in in a circumferential direction and an axial direction, the overcap is screwed onto the inner plug, the overcap and the inner plug are configured to be unscrewed by rotating the overcap in a loosening direction of right-hand threads with respect to the inner plug, and the inner bag is configured to move in a direction of coming out of the container main body by rotating the inner plug with respect to the outer shell in a loosening direction of right-hand threads.

(7) The double container of (6), wherein the ratio of T2 to T1 is 1.2 or more, where T1 is an overcap rotation torque required to rotate the overcap for first time with respect to the inner plug in a loosening direction of right-hand threads, and T2 is an inner plug rotation torque required to rotate the inner plug for first time with respect to the outer shell in a loosening direction of right-hand threads.

(8) The double container of (6) or (7), further comprising a shrink film, wherein the shrink film is installed in a covering state where the shrink film covers the container main body and the inner plug but does not cover the overcap, or the shrink film includes an easy-to-tear line such that the covering state is achieved after removing a part of the shrink film.

(9) A double container, comprising a container main body, a mouth part attachment, and a shrink film attached in such a way to cover the container main body and the mouth part attachment, wherein the container main body includes an inner bag and an outer shell disposed to cover the inner bag, the mouth part attachment includes an inner plug and an overcap, the inner plug is engaged with a mouth part of the inner bag in a circumferential direction and an axial direction, the overcap is engaged with the inner plug, the inner bag is configured to move in a direction of coming out of the container main body by rotating the inner plug with respect to the outer shell, and the shrink film is installed in a covering state where the shrink film covers the container main body and the inner plug but does not cover the overcap, or the shrink film includes an easy-to-tear line such that the covering state is achieved after removing a part of the shrink film.

In the present perspectives, when the mouth part attachment that is attached to the container main body by pushing-in is rotated with respect to the outer shell, the inner bag moves in the direction of coming out of the container main body, making it easy to pull out the inner bag from the container main body.

Eighth Perspective

According to the present perspective, the following aspects are provided.

(1) A method for discharging contents in a double container, comprising a pulling out step and a discharging step, wherein the double container includes a container main body and a cap attached to a mouth part of the container main body, the container main body includes an inner bag and an outer shell disposed to cover the inner bag, the contents are contained within the inner bag, the cap is engaged with the inner bag, in the pulling out step the inner bag is pulled out from the container main body while a part of the contents remain in the inner bag and the cap is engaged with the inner bag, and in the discharging step the contents remaining in the inner bag are discharged after being pulled out from the container main body.

(2) The method of (1), wherein a bottom part of the container main body includes a recess having an oval-shape cross-section.

(3) The method of (1) or (2), wherein the inner bag includes an annular protrusion that engages with the cap in an axial direction, and the inner bag includes an engaging protrusion that engages with the cap in a circumferential direction, and the engaging protrusion has a lower surface that is flush with a lower surface of the annular protrusion or is located closer to an open end of the inner bag than a lower surface of the annular protrusion.

(4) The method of any one of (1) to (3), wherein the inner bag includes a thin wall part having a wall thickness of 100 μm or less.

In the present perspective, the inner bag is pulled out from the container main body with the cap engaged with the inner bag, and then the contents remaining in the inner bag are discharged. Since the inner bag is more flexible than the outer shell, the contents are easily dischargeable, and the final residual amount of the contents is reducible using the method of the present perspective.

Fifth Perspective

According to the present perspective, the following aspects are provided.

(1) A method for manufacturing a double container, comprising a step of producing a container main body having an inner bag and an outer shell covering the inner bag by performing biaxial stretch blow molding on a preform having an inner preform and an outer preform disposed to cover the inner preform, wherein the inner preform is formed by performing direct blow molding on a molten tubular parison, a mouth part of the inner preform includes an engaging part for pulling out the inner bag from the container main body, ratio of D1 to D3 is 1.5 or more, where D1 is largest outer diameter of the mouth part of the inner preform, and D3 is an outer diameter of the tubular parison, and an open end of the inner preform includes an enlarged diameter structure that prevents deformation of the mouth part.

(2) The method of (1), wherein the ratio of D1 to D3 is two or more.

(3) The method of (1) or (2), wherein the inner preform has a wall thickness of 1.5 mm or less at the open end.

(4) The method of any one of (1) to (3), wherein ratio of D2 to D1 is 0.35 or more, where D2 is an outer diameter of the inner preform at a height of 0.1H from a bottom part of the inner preform, and H is a total height of the inner preform.

(5) The method of any one of (1) to (4), wherein the ratio of D2 to D1 is 0.5 or more.

(6) The method of any one of (1) to (5), wherein in the direct blow molding a molded body in which a bag part is connected to the open end of the inner preform is formed, and the inner preform is formed by cutting the bag part from the molded body.

In the present perspective, the open end of the inner preform is provided with an enlarged diameter structure that prevents deformation of the mouth part. Since the shape of the mouth part of the inner preform barely changes or does not change at all during biaxial stretch blow molding, an enlarged diameter structure is also provided at the open end of the inner bag to prevent deformation of the mouth part. If the open end of the inner bag is easily deformed, it may become difficult to pull out the inner bag. In the present perspective, however, deformation of the open end of the inner bag is prevented, making it possible to pull out the inner bag smoothly.

Ninth Perspective

According to the present perspective, the following aspects are provided.

(1) A double container, comprising a container main body, wherein the container main body includes an inner bag and an outer shell disposed to cover the inner bag, the container main body has three or more corner parts spaced apart in a circumferential direction on a cross-section at a distance of 0.2 J from a bottom surface of the container main body, where J is a total height of the container main body, and connecting parts having a larger radius of curvature than the corner parts are provided between the corner parts.

(2) The double container of (1), wherein a total number of the corner parts is four.

(3) The double container of (1) or (2), wherein, in the cross-section, value of (L1−L2)/L1, that is ratio of L1 minus L2 to L1, is 0.1 or less, where L1 is a length of the longest one of the connecting parts, and L2 is a length of the shortest one of the connecting parts.

(4) The double container of any one of (1) to (3), wherein, in the cross-section, ratio of R2 to R1 is 3 or more, where R1 is smallest radius of curvature at the corner parts, and R2 is largest radius of curvature at the connecting parts.

(5) The double container of any one of (1) to (4), wherein, in the cross-section, ratio of T1 to T2 is 0.90 or less, where T1 is smallest wall thickness of the inner bag at the corner parts, and T2 is largest wall thickness of the inner bag at the connecting parts.

(6) The double container of any one of (1) to (5), wherein, in the cross-section, smallest wall thickness of the inner bag at the corner parts is 95 μm or less.

In the present perspective, the outer edge of the container main body near the bottom part has three or more corner parts spaced apart in the circumferential direction. In a double container having such a shape, when the inner bag is rotated with respect to the outer shell, the diameter of the inner bag is likely to decrease while the corner parts are being folded. Hence, it is easy to pull out the inner bag from the container main body.

DESCRIPTION OF THE PREFERRED EMBODIMENTS

Figure 1:
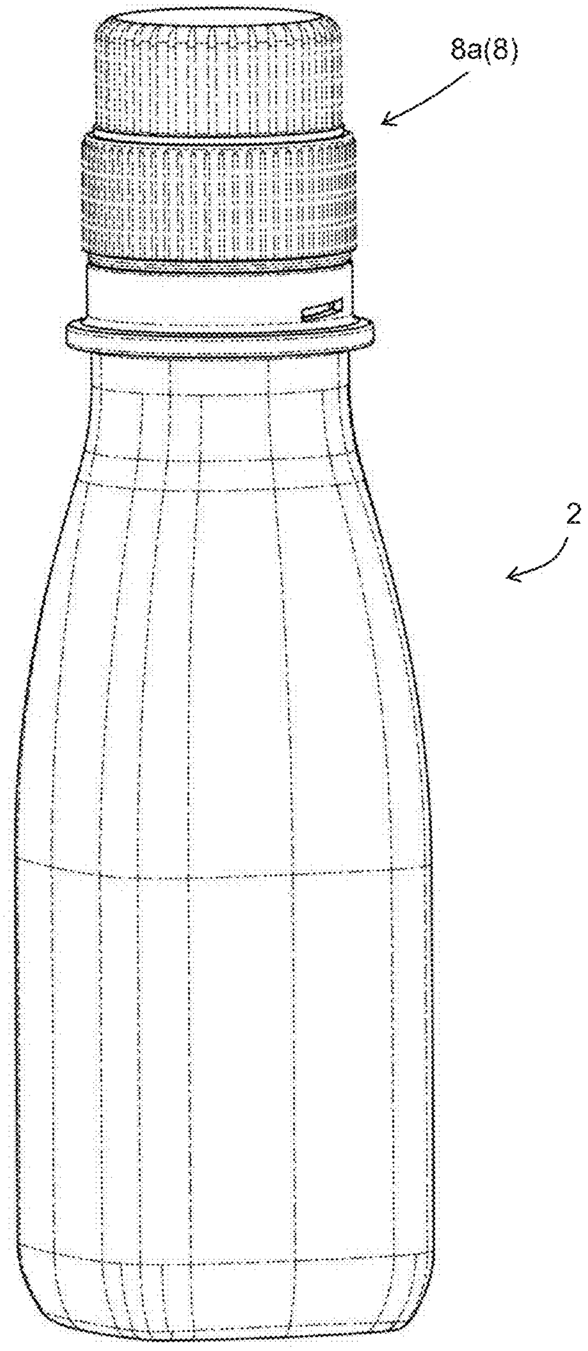
FIG. 1 is a perspective view of a double container 1 according to a first embodiment of the present invention. The dash-dotted line in the figure represents the boundary line where the curvature of the surface forming the surface shape changes. The same applies to other figures.

Embodiments of the present invention are described below. The features of the invention disclosed in the embodiments may be combined with one another. Further, each of the features may be regarded as an independent invention.

In the embodiments shown below, the first to tenth perspectives of the invention are disclosed, at least part of which is related to the claims. The first to fourth embodiments are related to the first to tenth perspectives. The sixth to seventh embodiments are related to the first to fourth and sixth to tenth perspectives.

First Perspective

The present perspective provides a method for manufacturing a container, comprising a step of manufacturing a container main body by performing biaxial stretch blow molding on a preform, wherein the preform includes a direct blow molded body formed by performing direct blow molding on a molten tubular parison, and the direct blow molded body is provided with a protruding sealing part in which a sealing part, formed by welding inner surfaces of the tubular parison to each other, protrudes from a main body part of the direct blow molded body.

Second Perspective

The present perspective provides a method for manufacturing a double container, comprising a step of producing a container main body having an inner bag and an outer shell covering the inner bag, by performing biaxial stretch blow molding on a preform having an inner preform and an outer preform disposed to cover the inner preform, wherein the inner preform is formed by performing direct blow molding on a molten tubular parison, the inner preform is provided with a protruding sealing part in which a sealing part, formed by welding inner surfaces of the tubular parison to each other, protrudes from a main body part of the inner preform, and the protruding sealing part is provided with an extension prevention structure that prevents extension of the sealing part during the biaxial stretch blow molding.

Third Perspective

The present perspective provides a method for manufacturing a double container, comprising a step of producing a container main body having an inner bag and an outer shell covering the inner bag, by performing biaxial stretch blow molding on a preform having an inner preform and an outer preform disposed to cover the inner preform, wherein the inner preform is formed by performing direct blow molding on a molten tubular parison, a mouth part of the inner preform includes an engaging part for pulling out the inner bag from the container main body, and ratio of D2 to D1 is 0.35 or more, where D1 is largest outer diameter of the inner preform at the mouth part, D2 is an outer diameter of the inner preform at a height of 0.1H from a bottom part of the inner preform, and H is a total height of the inner preform.

Fourth Perspective

The present perspective provides a method for manufacturing a double container, comprising a step of producing a container main body having an inner bag and an outer shell covering the inner bag, by performing biaxial stretch blow molding on a preform having an inner preform and an outer preform disposed to cover the inner preform, wherein the inner preform is formed by performing direct blow molding on a molten tubular parison, the inner bag includes a thin wall part with a wall thickness of 100 μm or less, and the inner preform is provided with an uneven shape or a lubricant on an outer surface of an area that includes a part corresponding to the thin wall part.

Fifth Perspective

The present perspective provides a method for manufacturing a double container, comprising a step of producing a container main body having an inner bag and an outer shell covering the inner bag, by performing biaxial stretch blow molding on a preform having an inner preform and an outer preform disposed to cover the inner preform, wherein the inner preform is formed by performing direct blow molding on a molten tubular parison, a mouth part of the inner preform includes an engaging part for pulling out the inner bag from the container main body, ratio of D1 to D3 is 1.5 or more, where D1 is largest outer diameter of the mouth part of the inner preform, and D3 is an outer diameter of the tubular parison, and an open end of the inner preform includes an enlarged diameter structure that prevents deformation of the mouth part.

Sixth Perspective

The present perspective provides a double container, comprising a container main body and a mouth part attachment, wherein the container main body includes an inner bag and an outer shell disposed to cover the inner bag, the mouth part attachment is attached to a mouth part of the container main body by pushing-in, and the inner bag is configured to move in a direction of coming out of the container main body via rotation of the mouth part attachment with respect to the outer shell.

Seventh Perspective

The present perspective provides a double container, comprising a container main body, a mouth part attachment, and a shrink film attached in such a way to cover the container main body and the mouth part attachment, wherein the container main body includes an inner bag and an outer shell disposed to cover the inner bag, the mouth part attachment includes an inner plug and an overcap, the inner plug is engaged with a mouth part of the inner bag in a circumferential direction and an axial direction, the overcap is engaged with the inner plug, the inner bag is configured to move in a direction of coming out of the container main body by rotating the inner plug with respect to the outer shell, and the shrink film is installed in a covering state where the shrink film covers the container main body and the inner plug but does not cover the overcap, or the shrink film includes an easy-to-tear line such that the covering state is achieved after removing a part of the shrink film.

Eighth Perspective

The present perspective provides a method for discharging contents in a double container, comprising a pulling out step and a discharging step, wherein the double container includes a container main body and a cap attached to a mouth part of the container main body, the container main body includes an inner bag and an outer shell disposed to cover the inner bag, the contents are contained within the inner bag, the cap is engaged with the inner bag, in the pulling out step, the inner bag is pulled out from the container main body while a part of the contents remain in the inner bag and the cap is engaged with the inner bag, and in the discharging step, the contents remaining in the inner bag are discharged after being pulled out from the container main body.

Nineth Perspective

The present perspective provides a double container, comprising a container main body, wherein the container main body includes an inner bag and an outer shell disposed to cover the inner bag, the container main body has three or more corner parts spaced apart in a circumferential direction on a cross-section at a distance of 0.2 J from a bottom surface of the container main body, where J is a total height of the container main body, and connecting parts having a larger radius of curvature than the corner parts are provided between the corner parts.

Tenth Perspective

The present perspective provides a double container, comprising a container main body, wherein the container main body includes an inner bag and an outer shell disposed to cover the inner bag, and the inner bag includes, in order from inside of the container main body, an inner layer, a gas barrier layer, and an outer layer.

1. First Embodiment

1-1. Configuration of the Double Container 1

<Basic Configuration>

As shown in FIG. 1, the double container 1 according to the first embodiment of the present invention includes a container main body 2 and a mouth part attachment 8.

Figure 2:
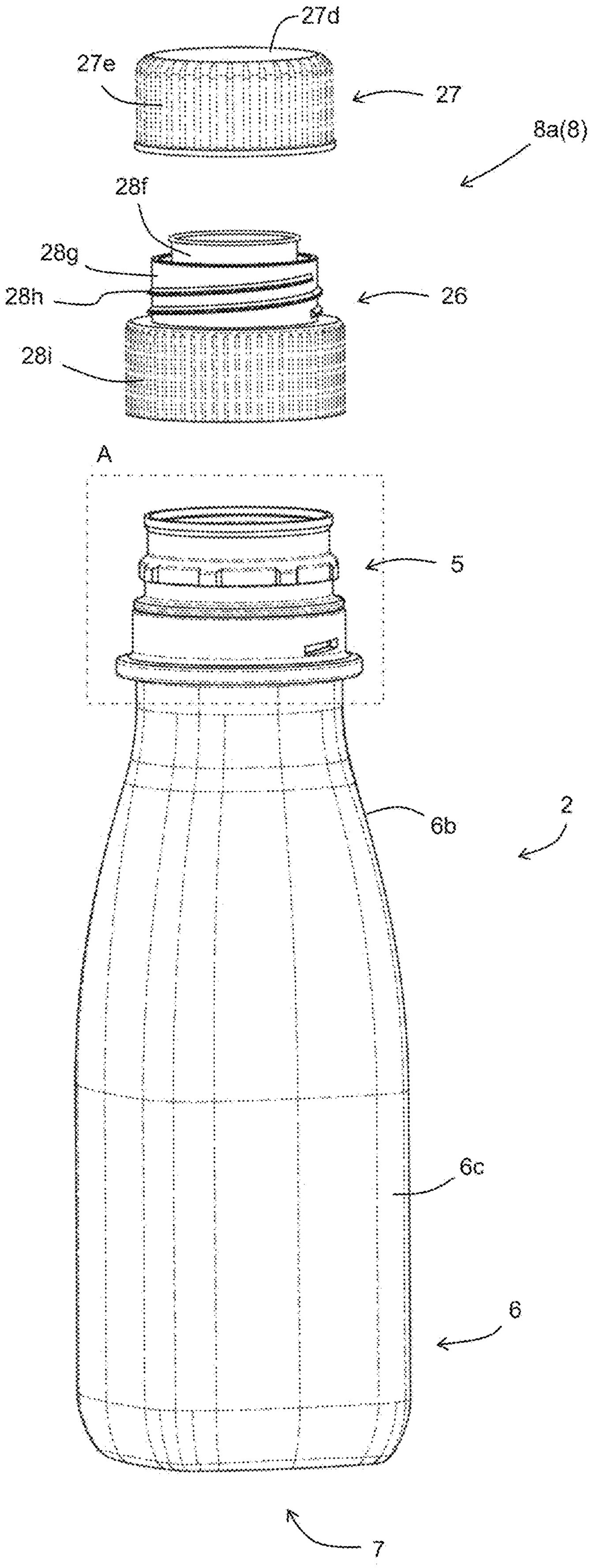
FIG. 2 is an exploded perspective view of FIG. 1.
Figure 3:
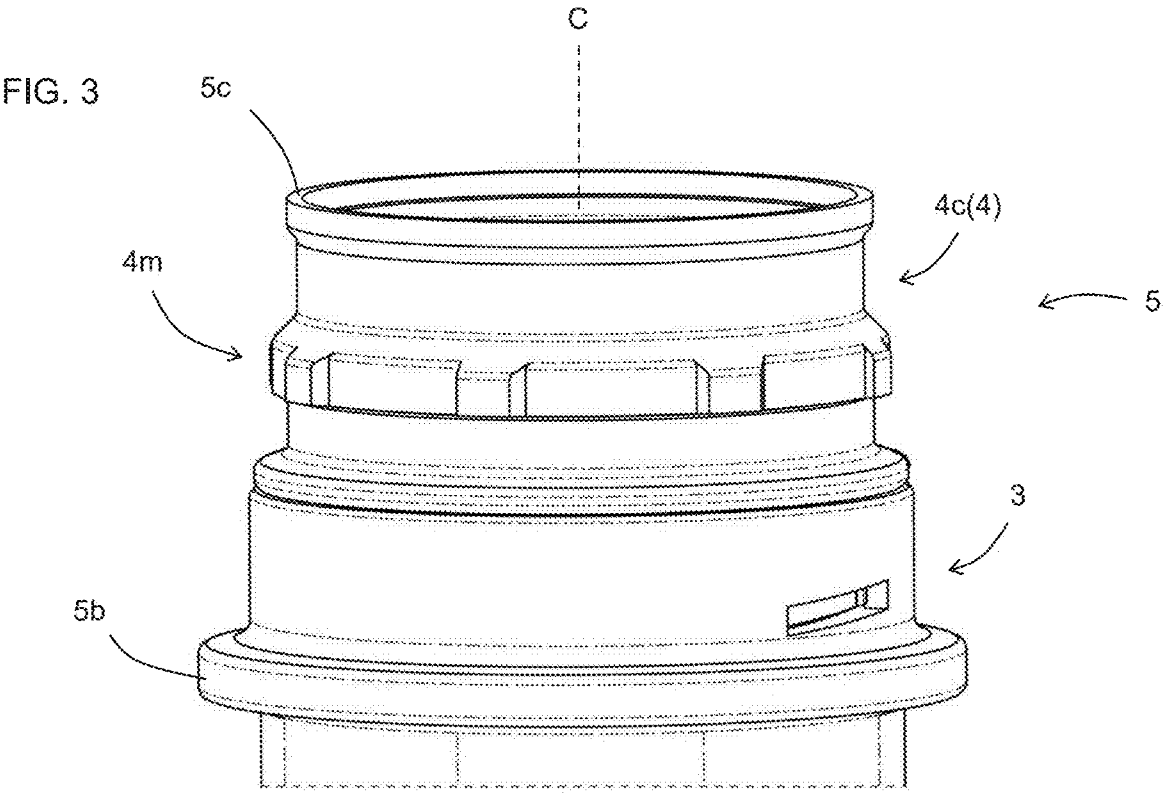
FIG. 3 is an enlarged view of area A in FIG. 2.

As shown in FIGS. 2 and 3, the container main body 2 includes a mouth part 5, a trunk part 6, and a bottom part 7. The mouth part 5 is a tubular (preferably cylindrical) part having an open end 5*c*. The mouth part 5 includes an engaging part 4*m* to which a mouth part attachment 8 such as a cap or a pump is attachable. Details of the engaging part 4*m* are described later. The mouth part 5 is provided with a flange 5*b*. The flange 5*b* can be used to support the mouth part 5 when the mouth part attachment 8 is attached to the mouth part 5.

The trunk part 6 is disposed adjacent to the mouth part 5 on a side further away from the open end 5*c* than the mouth part 5. The trunk part 6 has a larger outer diameter (in this specification, "outer diameter" means the diameter of an equivalent circle when the cross-section is not circular) than the mouth part 5. The trunk part 6 has a tubular shape, and the bottom part 7 is provided at the lower end of the trunk part 6 and closes the lower end of the trunk part 6. The trunk part 6 includes a shoulder part 6*b* whose outer diameter increases as the distance from the mouth part 5 increases. Further, the trunk part 6 includes a trunk part 6*c*, which is disposed closer to the bottom part 7 than the shoulder part 6*b*. The trunk part 6*c* has, for example, a shape in which the outer diameter is substantially constant toward the bottom part 7, or a shape in which the diameter decreases toward the bottom part 7.

Figure 4:
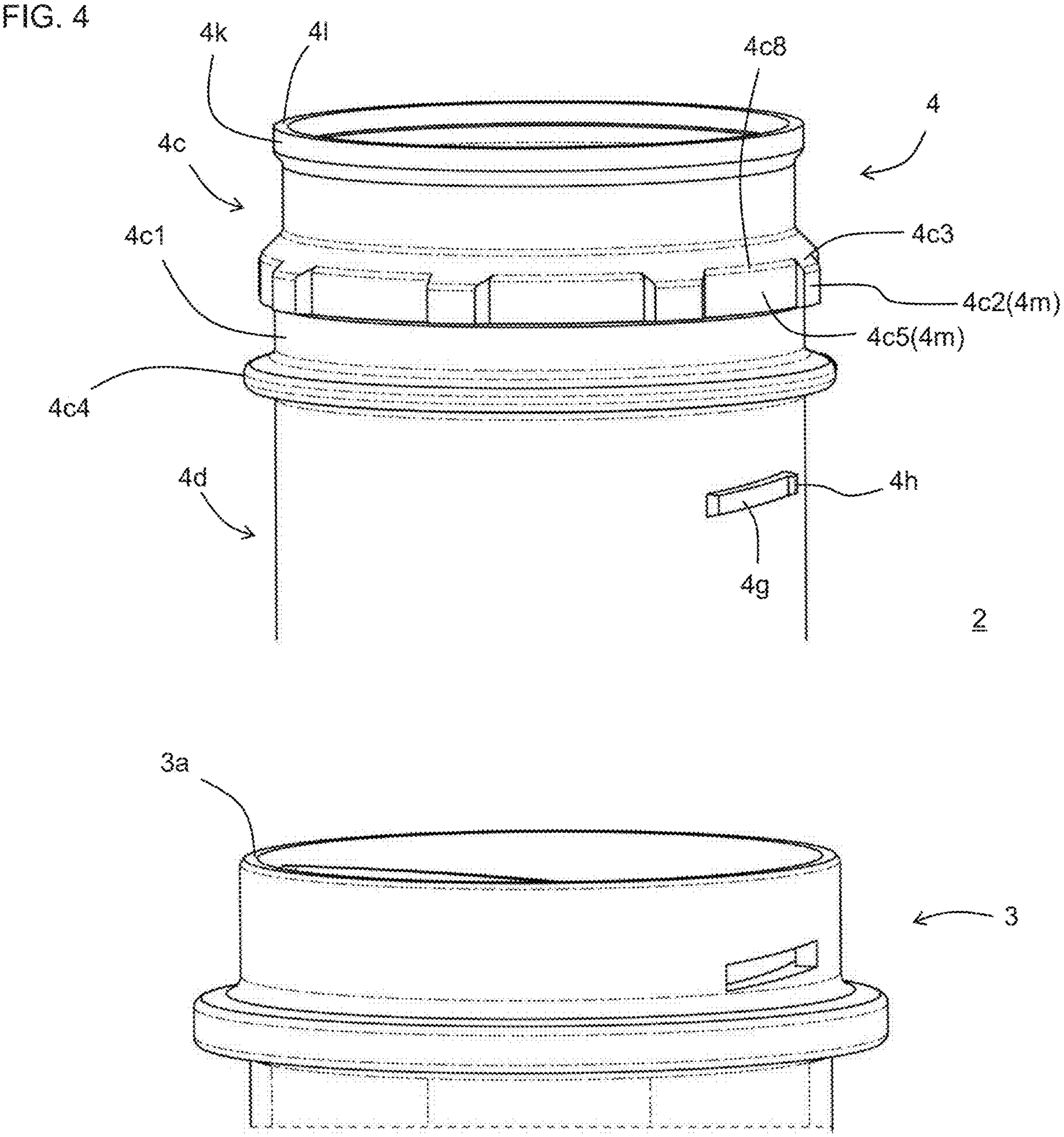
FIG. 4 is an exploded perspective view of FIG. 3. Only a part of an inner bag 4 near an open end 5*c* is shown.

As shown in FIG. 4, the container main body 2 includes an inner bag 4 and an outer shell 3. The outer shell 3 is disposed in such a way to cover the inner bag 4. The inner bag main body 4*d* excluding the protrusion 4*c* is housed in the outer shell 3. In the following descriptions, parts of the inner bag 4 that correspond to the mouth part 5, trunk part 6, and bottom part 7 of the container main body 2 are referred to as the mouth part 5, trunk part 6, and bottom part 7 of the inner bag 4, respectively. The same applies to the outer shell 3.

The average wall thickness of the outer shell 3 at the center of the trunk part 6 in the height direction is, for example, 200 to 800 μm, and preferably 250 to 500 μm. This wall thickness is, for example, 250, 300, 350, 400, 450, 500, 550, 600, 650, 700, 750, 800 μm; the wall thickness may also be set to an arbitrary value between any two of these exemplary values.

The average wall thickness of the inner bag 4 at the center of the trunk part 6 in the height direction is, for example, 50 to 250 μm, and preferably 50 to 100 μm. This wall thickness is, for example, 50, 60, 70, 80, 90, 100, 110, 120, 130, 140, 150, 160, 170, 180, 190, 200, 210, 220, 230, 240, 250 μm; the wall thickness may also be set to an arbitrary value between any two of these exemplary values, or equal to or below any of these exemplary values. In this specification, the average wall thickness at a predetermined height position means the average value of the measurements at eight measurement locations disposed at equal intervals in the circumferential direction at the height position.

If the mouth part attachment 8 is not provided with a check valve, the inner bag 4 does not contract even after the contents of the inner bag 4 are discharged, so the inner bag 4 cannot be easily pulled out through the mouth part 5 of the outer shell 3. Since the present invention is aimed at making it easy to pull out the inner bag 4 through the mouth part 5 of the outer shell 3, the present invention is particularly effective when the mouth part attachment 8 is not provided with a check valve.

The inner diameter of the mouth part 5 of the outer shell 3 is, for example, 20 to 50 mm, and preferably 25 to 40 mm. This diameter is, for example, 20, 25, 30, 35, 40, 45, 50 mm; the diameter may also be set to an arbitrary value between any two of these exemplary values. The length of the mouth part 5 is, for example, 15 to 45 mm. This length is, for example, 15, 20, 25, 30, 35, 40, 45 mm; the length may also be set to an arbitrary value between any two of these exemplary values.

<Detailed Structures of the Outer Shell 3 and Inner Bag 4>

As shown in FIGS. 3 and 4, the inner bag 4 includes a protrusion 4*c* that protrudes from the open end 3*a* of the outer shell 3. The protrusion 4*c* includes a protruding tube 4*c*1, an engaging part 4*c*2, an annular protrusion 4*c*5, and an abutting flange 4*c*4.

The annular protrusions 4*c*5 engage with the mouth part attachment 8 in the axial direction. The engaging protrusions 4*c*2 engage with the mouth part attachment 8 in the circumferential direction. In this specification, the "axial direction" is the direction in which the central axis C of the mouth part 5 extends, or in other words, the direction in which the inner bag 4 is extracted from the container main body 2. The "circumferential direction" is a direction in which the mouth part 5 is rotated about the central axis C, or in other words, a direction in which the inner bag 4 is rotated with respect to the outer shell 3, in the mouth part 5.

It is preferable that the engaging protrusions 4*c*2 are provided at a plurality of locations (eight locations in this embodiment) spaced apart in the circumferential direction. The engaging protrusions 4*c*2 are arranged on the annular protrusions 4*c*5, and are arranged so as to protrude radially outward from the annular protrusion 4*c*5. The annular protrusions 4*c*5 and the engaging protrusions 4*c*2 are provided with tapered surfaces 4*c*8 and 4*c*3 on their upper surfaces. This makes it easy for the annular protrusions 28*c* (shown in FIG. 7A) of the mouth part attachment 8 to climb over the annular protrusions 4*c*5 and the engaging protrusions 4*c*2, as described later.

Figure 7A:
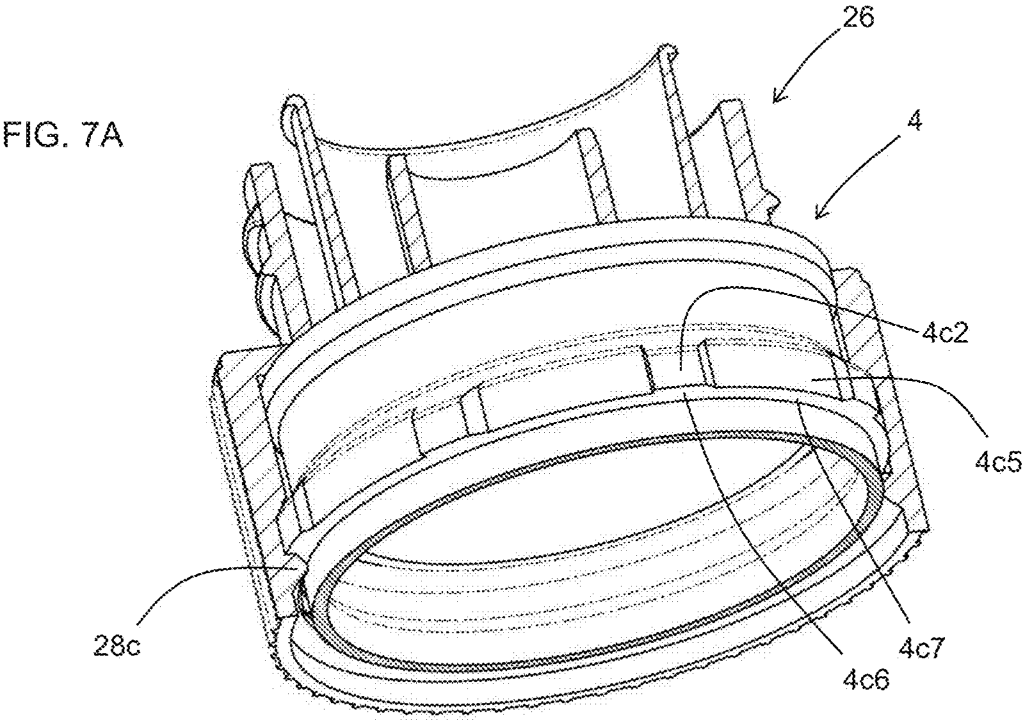
FIG. 7A shows a state in which the inner plug 26 is attached to the inner bag 4. A perspective view of the inner bag 4 in the vicinity of a mouth part 5 and a vertical cross-sectional perspective view of the inner plug 26 are shown.
Figure 7B:
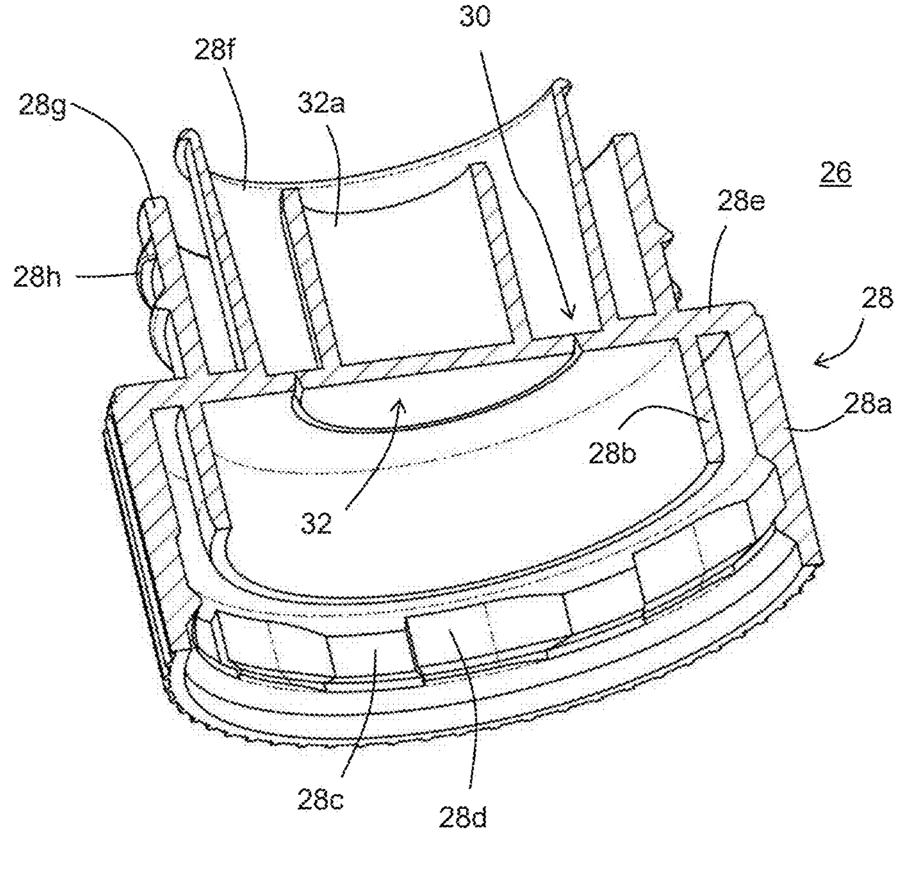
FIG. 7B is a vertical cross-sectional perspective view of the inner plug 26.

Further, as shown in FIG. 7A, the lower surface 4*c*6 of the engaging protrusion 4*c*2 is flush with the lower surface 4*c*7 of the annular protrusion 4*c*5, or is positioned closer to the open end of the inner bag 4 than the lower surface 4*c*7 of the annular protrusion 4*c*5. According to such a configuration, the engagement between the mouth part attachment 8 and the inner bag 4 is reinforced, since the axial engagement between the annular protrusions 4*c*5 and the mouth part attachment 8 is reinforced by the engaging protrusion 4*c*2.

The abutting flange 4*c*4 is positioned so as to contact the open end 3*a*. The abutting flange 4*c*4 is an annular part whose diameter is larger than that of the protruding tube 4*c*1. By abutting the abutting flange 4*c*4 against the open end 3*a*, the inner bag 4 is prevented from falling into the outer shell 3.

As shown in FIG. 4, cam protrusions 4*g* and engaging protrusions 4*h* are provided on the outer peripheral surface of the inner bag main body 4*d*. The engaging protrusions 4*h* are provided on the cam protrusions 4*g*. The lower surfaces of the cam protrusions 4*g* and the engaging protrusions 4*h* are each inclined so as to approach the open end 5*c* as they proceed counterclockwise when viewed from the open end 5*c* side of the mouth part 5.

Figure 5:
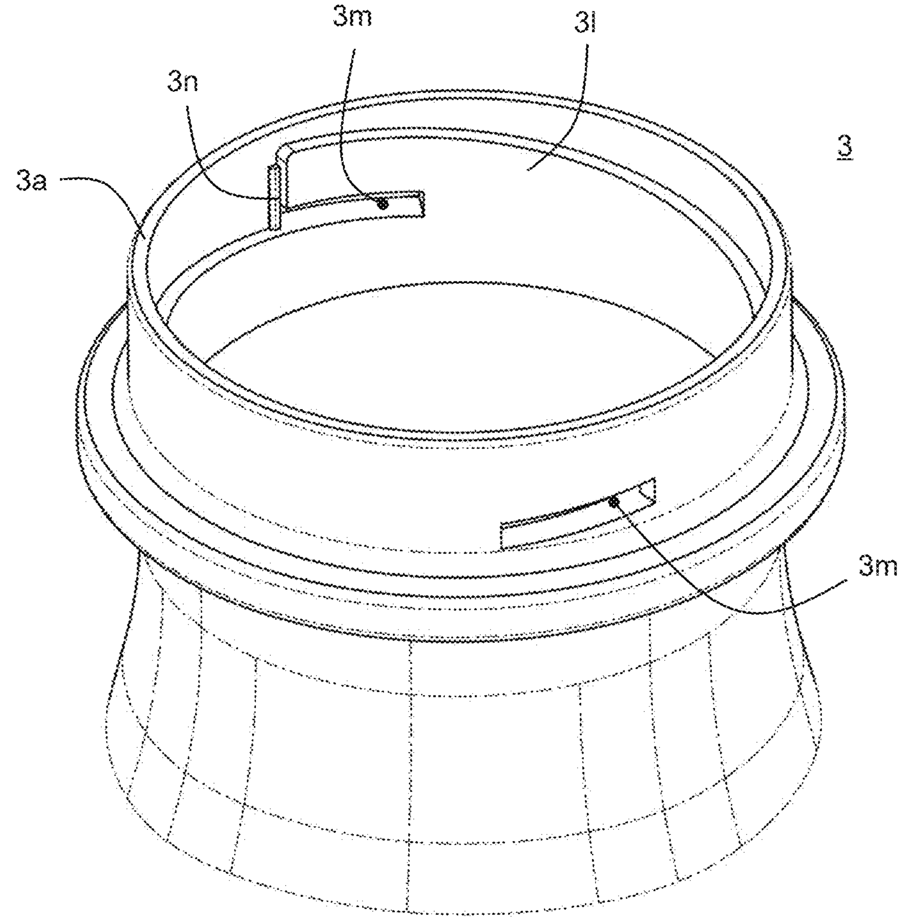
FIG. 5 is a perspective view of the vicinity of the open end of an outer shell 3.

As shown in FIG. 5, the inner peripheral surface of the outer shell 3 is provided with cam rails 31, engaging recesses 3*m*, and engaging protrusions 3*n*. The engaging recesses 3*m* are provided such that the lower surfaces of the engaging recesses 3*m* are continuous with the upper surfaces of the cam rails 31. The upper surfaces of the cam rails 31 and the lower surfaces of the engaging recesses 3*m* are inclined so as to approach the open end 3*a* as they proceed counterclockwise when viewed from the open end 3*a* side. The engaging protrusions 3*n* are positioned adjacent to an engaging recess 3*m*.

Before the inner bag 4 is extracted from the container main body 2, the engaging protrusions 4*h* are disposed within the engaging recesses 3*m*, and the lower surfaces of the cam protrusions 4*g* are in contact with the upper surfaces of the cam rails 31. A cam mechanism 31 is constituted by the cam protrusions 4*g* and the cam rails 31. In this embodiment, the engaging recesses 3*m* are through holes, but may be non-through holes.

Trying to rotate the inner bag 4 counterclockwise results in the engaging protrusions 4*h* coming into contact with the engaging protrusions 3*n* to restrict the rotation. This restriction is not strong; applying a strong torque (i.e., a torque equal to or greater than the inner plug rotation torque T2 explained later) to the inner bag 4 allows the engaging protrusions 4*h* to climb over the engaging protrusions 3*n* to enable the inner bag 4 to freely rotate relative to the outer shell 3. Then, further rotating the inner bag 4 counterclockwise allows the inner bag 4 to move in the direction of coming out of the container main body 2 due to the action of the cam mechanism 31. When this occurs, the inner bag 4 is twisted to reduce its diameter.

An enlarged diameter structure 4*k* is provided at the open end 4*l* of the inner bag 4. The enlarged diameter structure 4*k* increases the rigidity of the opening 5 of the inner bag 4 and prevents deformation of the opening 5 of the inner bag 4. In this embodiment, since the inner bag 4 is extracted using the engaging part 4*m* (more specifically, the annular protrusions 4*c*5 and the engaging protrusions 4*c*2) provided on the inner bag 4, there are cases where a high load is applied to the inner bag 4. In such cases, it may become difficult to extract the inner bag 4 if the open end 4*l* of the inner bag 4 is easily deformed. In this embodiment, however, the inner bag 4 is smoothly extractable since the deformation of the open end 4*l* of the inner bag 4 is prevented.

<Pulling Out the Inner Bag 4 by a Simple Operation>

The mouth part attachment 8 is configured to be attachable to the mouth part 5 of the container main body 2 by pushing-in; by pressing the mouth part attachment 8 in the direction of the bottom part 7 while the mouth part attachment 8 is placed over the mouth part 5, the mouth part attachment 8 can be engaged with and attached to the mouth part 5. Since the push-in type mouth part attachment 8 can be attached simply by pressing, it has the advantage that the step of attaching the mouth part attachment 8 can be simplified on the line for filling the contents.

A push-in type mouth part attachment generally includes a separation band that is separable from the inner plug, and the mouth part attachment is configured to be attached to the container main body by engaging the engaging part of the separation band with the engaging part of the outer shell. When removing the mouth part attachment from the mouth part, the engaging force between the mouth part attachment and the outer shell is weakened (usually, disengaged) by first tearing off the connection between the inner plug and the separation band and removing the separation band. After that, an operation is performed to remove the mouth part attachment from the mouth part. However, it is cumbersome to perform an operation to weaken the engagement force between the mouth part attachment and the outer shell before removing the mouth part attachment from the mouth part. The operation of weakening the engagement force may be an operation of weakening the engagement force between the separation band and the outer shell, for example, by making a notch in the separation band without removing the separation band.

In this embodiment, in order to solve the above problem, the inner bag 4 is configured to move in the direction of coming out of the container main body 2 (i.e., to lift the inner bag 4) by rotating the mouth part attachment 8 with respect to the outer shell 3, and it is possible to rotate the mouth part attachment 8 relative to the outer shell 3 without performing an operation to weaken the engagement force between the mouth part attachment 8 and the outer shell 3 before rotating the mouth part attachment 8 relative to the container main body 2. In other words, the mouth part attachment 8 can be rotated while the mouth part attachment 8 and the outer shell 3 are engaged with each other when the mouth part attachment 8 is attached to the mouth part 5 of the container main body 2.

More specifically, the mouth part attachment 8 is engaged, by pushing-in, with the mouth part 5 of the inner bag 4 in the circumferential direction and the axial direction, and as the mouth part attachment 8 rotates, the inner bag 4 is configured to rotate relative to the outer shell 3. By the action of the cam mechanism 31 provided between the inner bag 4 and the outer shell 3, the inner bag 4 is configured to move in the direction of coming out of the container main body 2 as the inner bag 4 rotates.

According to such a configuration, the inner bag 4 can be moved in the direction of coming out of the container main body 2 simply by rotating the mouth part attachment 8 without performing troublesome operations such as removing the separation band in advance. After that, the inner bag 4 is extractable from the container main body 2 by pulling the mouth part attachment 8. In other words, since the inner bag 4 is extractable simply by turning and pulling the mouth part attachment 8, the operation required to extract the inner bag 4 becomes very simple. The rotation of the mouth part attachment 8 at this time is preferably rotation in the loosening direction of right-hand threads (i.e., in the counterclockwise direction when viewed from the top of the dual container 1). In this case, there is an advantage that it is intuitively understandable that the inner bag 4 moves in the direction of coming out of the container main body 2.

Also, since the trunk part 6 of the container main body 2 has a larger outer diameter than the mouth part 5, it is not easy to extract the inner bag 4 through the mouth part 5 of the outer shell 3 by simply pulling the inner bag 4. However, by rotating the opening 5 of the inner bag 4 and twisting the inner bag 4 to reduce the diameter of the trunk part 6 of the inner bag 4, it becomes easy for the trunk part 6 of the inner bag 4 to pass through the opening 5 of the outer shell 3, and the inner bag 4 is easily extractable from the container main body 2.

<Detailed Structure of the Mouth Part Attachment 8>

As shown in FIG. 2, in this embodiment, the mouth part attachment 8 is a cap 8*a*, and includes an inner plug 26 and an overcap 27. The inner plug 26 is engaged, by pushing-in, with the opening 5 of the inner bag 4 in the circumferential direction and the axial direction. The overcap 27 is screwed onto the inner plug 26.

Figure 6:
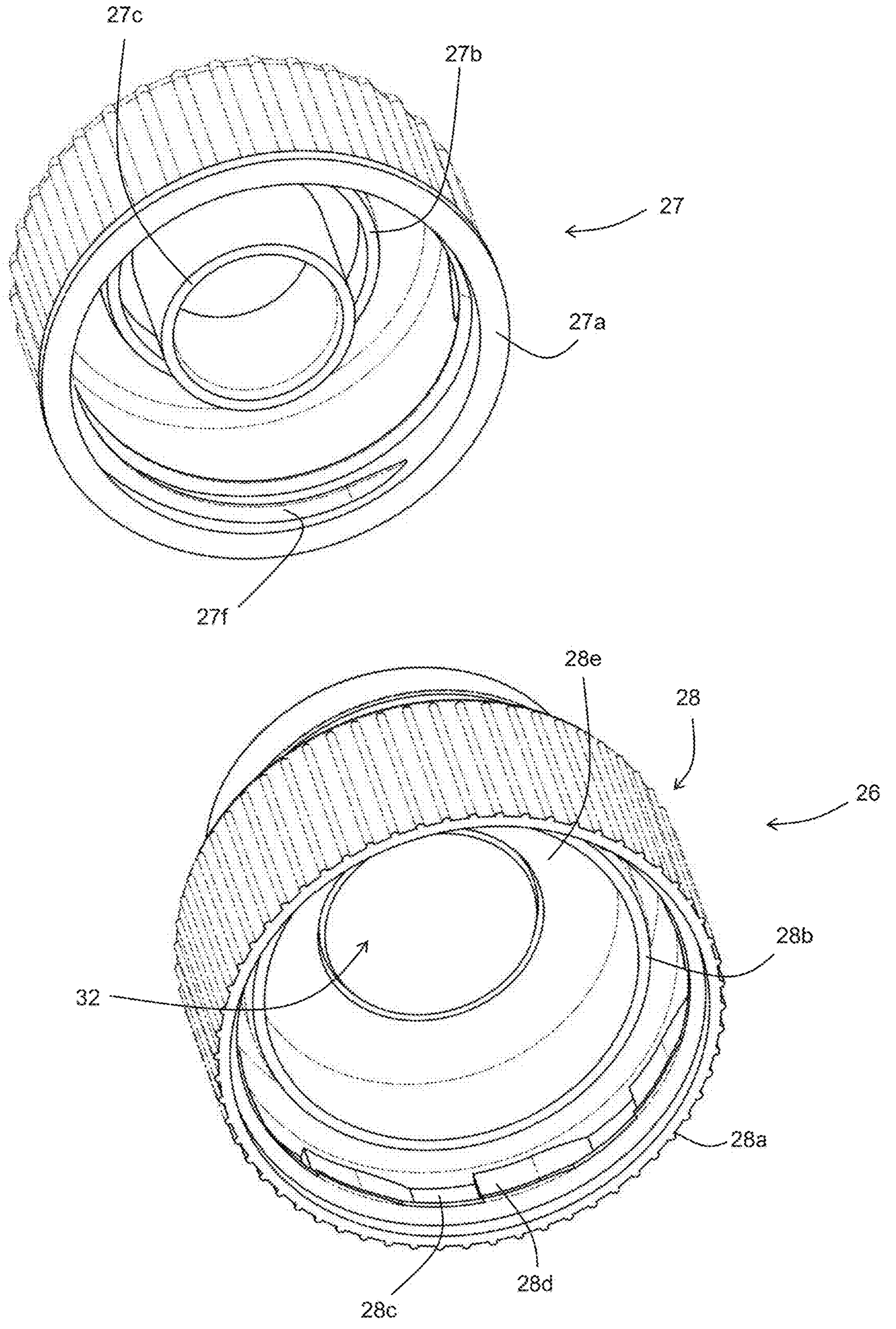
FIG. 6 is a perspective view of an overcap 27 and an inner plug 26, seen diagonally from below.
Figure 8:
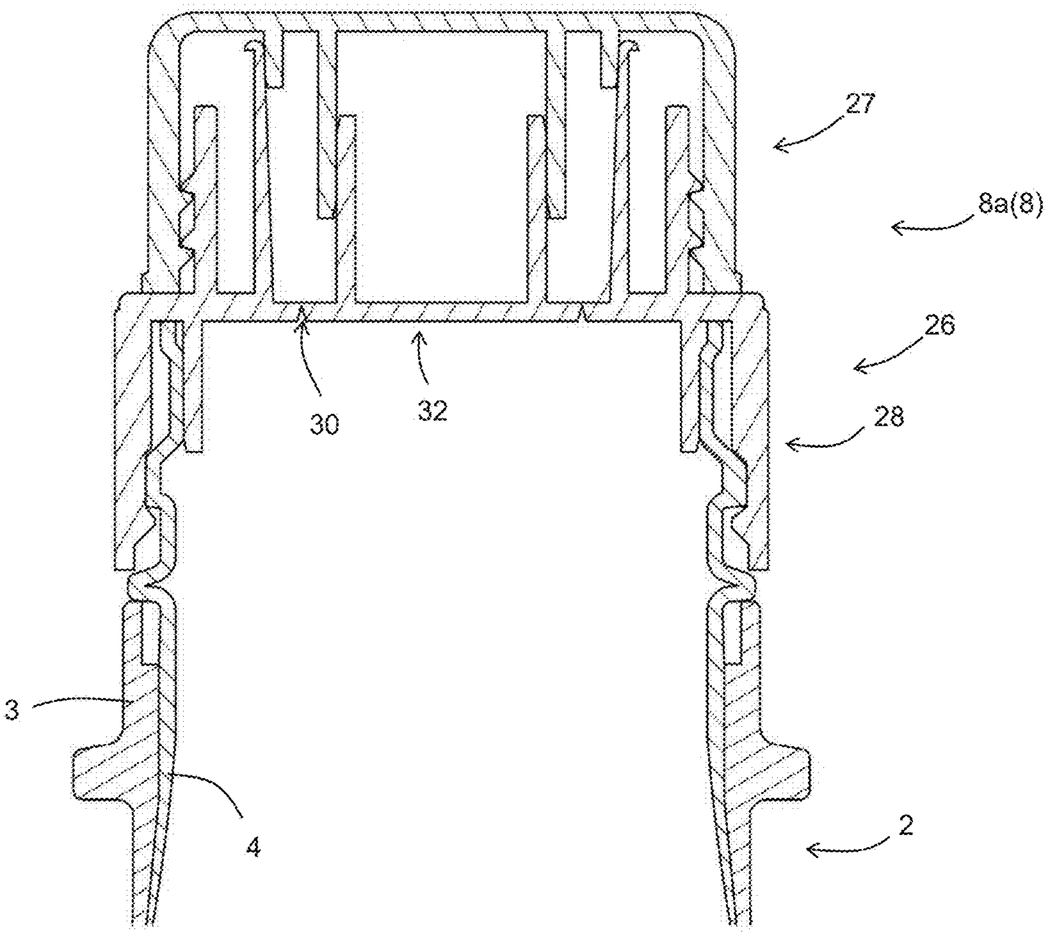
FIG. 8 is a vertical cross-sectional view, passing through the center of the mouth part 5, of the double container 1 shown in FIG. 1, prior to opening the overcap 27.

As shown in FIGS. 2, 6, and 8, the overcap 27 includes an outer tube 27*a*, an intermediate tube 27*b*, an inner tube 27*c*, and a top plate 27*d*.

A knurl 27e is provided on the outer peripheral surface of the outer tube 27a, making it easy to grip and rotate the overcap 27. A female threaded part 27f is provided on the inner peripheral surface of the outer tube 27a. The top plate 27d is provided on the upper surface of the outer tube 27a. The intermediate tube 27b and the inner tube 27c are provided on the lower surface of the top plate 27d. The intermediate tube 27b is a so-called inner ring that has a smaller diameter than the outer tube 27a and is arranged inside the outer tube 27a. The inner tube 27c has a smaller diameter than the intermediate tube 27b, and is arranged inside the intermediate tube 27b.

As shown in FIGS. 2 and 6 to 8, the inner plug 26 includes a main body part 28 and an opening part 32. The main body part 28 and the opening part 32 are connected to each other via an easy-to-tear connecting part 30.

The main body part 28 includes an outer tube 28a, an inner tube 28b, an annular protrusion 28c, an engaging protrusion 28d, a top plate 28e, a discharging tube 28f, and a mounting tube 28g. The opening part 32 and the connecting part 30 are arranged inside the discharging tube 28f and the inner tube 28b. The opening part 32 is provided with an engaging tube 32a provided with an engaging part (not shown), and the inner tube 27c and the engaging tube 32a are engaged in the circumferential direction and the axial direction. According to such a configuration, by rotating the overcap 27 with respect to the main body part 28, it becomes possible to rotate the engaging tube 32a with respect to the main body part and break the connecting part 30. By breaking the connecting part 30, the opening part 32 is separated from the main body part 28, and a flow hole is formed inside the discharging tube 28f and the inner tube 28b. The contents in the inner bag 4 can be discharged through this flow hole.

A knurl 28i is provided on the outer peripheral surface of the outer tube 27a, making it easy to grip and rotate the inner plug 26. The top plate 28e is provided on the upper surface of the outer tube 28a. An inner tube 28b is provided on the lower surface of the top plate 28e. The inner tube 28b is a so-called inner ring that has a smaller diameter than the outer tube 28a and is arranged inside the outer tube 28a. When the inner plug 26 is attached to the mouth part 5, the inner tube 28b is inserted into the inner bag 4, and the outer peripheral surface of the inner tube 28b comes into close contact with the inner peripheral surface of the inner bag 4.

A discharging tube 28f and a mounting tube 28g are provided on the top surface of the top plate 28e. The contents in the inner bag 4 are discharged through the discharging tube 28f. As shown in FIG. 2, a male threaded part 28h is provided on the outer peripheral surface of the mounting tube 28g, and a female threaded part 28h is provided on the inner peripheral surface of the outer tube 27a of the overcap 27; as the male threaded part 28h engages with the female threaded part 27f, the overcap 27 is screwed onto the inner plug 26. In this case, the overcap 27 can be attached to and removed from the inner plug 26 by rotating the overcap 27 relative to the inner plug 26. When the overcap 27 is attached to the inner plug 26, the intermediate tube 27b is inserted into the discharging tube 28f, and the outer peripheral surface of the intermediate tube 27b is brought into close contact with the inner peripheral surface of the discharging tube 28f. The upper side of the discharging tube 28f is closed by the overcap 27.

The annular protrusions 28c are annular protrusions provided on the inner peripheral surface of the outer tube 28a in such a way to extend in the circumferential direction. When the annular protrusions 28c engage with the engaging protrusions 4c2 in the axial direction, the main body part 28 engages with the mouth part 5 of the inner bag 4 in the axial direction. It is preferable that the engaging protrusions 28d are provided at a plurality of locations (eight locations in this embodiment) spaced apart in the circumferential direction. The engaging protrusions 28d are disposed on the annular protrusions 28c so as to protrude radially inward from the annular protrusion 28c. The engaging protrusions 28d are arranged between the adjacent engaging protrusions 4c2, so that the main body part 28 engages with the mouth part 5 of the inner bag 4 in the circumferential direction.

<Rotation Directions and Torque of the Overcap 27 and Inner Plug 26>

The overcap 27 is preferably screwed onto the inner plug 26 with right-hand threads. Thus, by rotating the overcap 27 with respect to the inner plug 26 in the loosening direction of right-hand threads, the overcap 27 and the inner plug 26 can be unscrewed from each other. In addition, by rotating the inner plug 26 with respect to the outer shell 3 in the loosening direction of right-hand threads, the inner bag 4 is configured to move in the direction of coming out of the container main body 2. In this way, the overcap 27 can be removed by rotating the overcap 27 in the loosening direction of right-hand threads, and by rotating the inner plug 26 in the loosening direction of right-hand threads, the inner bag 4 can be lifted up. Since both operations are performed in the same direction of rotation, they have the advantage of being simple to operate.

On the other hand, in the case of the above configuration, when the container main body 2 and the overcap 27 are gripped and the overcap 27 is rotated in the loosening direction of right-hand threads, the overcap 27 does not rotate relative to the inner plug 26; instead, the overcap 27 and the inner plug 26 rotate together relative to the container main body 2, and as a result, there is a concern that the inner bag 4 may float up.

In order to prevent the occurrence of such a problem, in this embodiment, the value of T2/T1 (i.e., T2 divided by T1) is preferably equal to or greater than 1.2, where T1 is the overcap rotational torque required to rotate the overcap 27 for the first time with respect to the inner plug 26 in the loosening direction of right-hand threads, and T2 is the inner plug rotational torque required to rotate the inner plug 26 for the first time with respect to the outer shell 3 in the loosening direction of right-hand threads. Applying a torque equal to or greater than the overcap rotational torque T1 to the overcap 27 allows the overcap 27 to be rotated in the loosening direction. Applying a torque equal to or greater than the inner plug rotational torque T2 to the inner plug 26 allows the inner plug 26 to be rotated in the loosening direction.

In this case, when the container main body 2 and the overcap 27 are gripped and the overcap 27 is rotated in the loosening direction of right-hand threads, the overcap 27 rotates relative to the inner plug 26 before the inner plug 26 rotates relative to the outer shell 3, preventing the occurrence of the above problem. The value of T2/T1 is, for example, 1.2 to 5, and preferably 1.5 to 3. The value of T2/T1 is, for example, 1.2, 1.5, 2.0, 2.5, 3.0, 3.5, 4.0, 4.5, 5.0; the value of T2/T1 may also be set to an arbitrary value between any two of these exemplary values.

The value of T1 is, for example, 40 to 120 N·cm, preferably 60 to 100 N·cm. The value of T2 is, for example, 100 to 200 N·cm, preferably 130 to 170 N·cm. Specifically, the value of T1 is, for example, 40, 50, 60, 70, 80, 90, 100, 110, 120 N cm, or may also be set to an arbitrary value between any two of these exemplary values, or equal to or below any of these exemplary values, or equal to or above any of these exemplary values. Specifically, the value of T2 is, for example, 100, 110, 120, 130, 140, 150, 160, 170, 180, 190, 200 N cm, or may also be set to an arbitrary value between any two of these exemplary values, or equal to or below any of these exemplary values, or equal to or above any of these exemplary values.

In the present embodiment, the overcap rotation torque T1 is the torque necessary to break the connecting part 30 and separate the opening part 32 from the main body part 28. In another embodiment, instead of providing the opening part 32 on the inner plug 26, the overcap 27 is provided with an opening ring via an easy-to-tear connecting part, and the opening ring engages the inner plug 26 in the circumferential direction. In such a configuration, the torque required to break the thin wall part and separate the opening ring from the overcap 27 is the overcap rotation torque T1. Also, in another embodiment, a rotation restriction structure is provided that restricts rotation of the overcap 27 with respect to the inner plug 26; when the rotation restriction by the rotation restriction structure is released at a predetermined torque (e.g., when rotation is restricted as the protrusion of the overcap 27 and the protrusion of the inner plug 26 come into contact with each other, and the restriction on rotation is released as the protrusion of the overcap 27 climbs over the protrusion of the inner plug 26), the torque required to release the restriction is the overcap rotation torque T1.

In this embodiment, the inner plug rotational torque T2 is the torque necessary for the engaging protrusions 4*h* to climb over the engaging protrusions 3*n*. In another embodiment, for example, the inner plug 26 and the outer shell 3 may be engaged in the circumferential direction, and the engagement may be released when the inner plug rotation torque T2 is applied.

The value of T3/T2 is preferably equal to or greater than 1.2, where T3 is the overturn torque required to rotate the inner plug 26 for the first time in the loosening direction of right-hand threads with respect to the inner bag 4. This prevents the inner plug 26 from rotating idly relative to the inner bag 4. The value of T3/T2 is, for example, 1.2 to 5, and is preferably 1.5 to 3. Specifically, for example, the value of T3/T2 is 1.2, 1.5, 2.0, 2.5, 3.0, 3.5, 4.0, 4.5, 5.0, or may also be set to an arbitrary value between any two of these exemplary values, or equal to or above any of these exemplary values.

The value of T3 is, for example, 200 N·cm or more, and is preferably 200 to 1000 N·cm. Specifically, for example, the value of T3 is 200, 250, 300, 350, 400, 500, 1000 N·cm, or may also be set to an arbitrary value between any two of these exemplary values. In this embodiment, the overturn torque T3 is the torque necessary for the engaging protrusions 28*d* to climb over the engaging protrusions 4*c*2.

<Preventing Erroneous Operations Using a Shrink Film>

There is a possibility that the user intends to grip and rotate the overcap 27, but accidentally grips and rotates the inner plug 26. In this case, as the inner plug 26 rotates, the inner bag 4 may be twisted and the contents may overflow.

Figure 9:
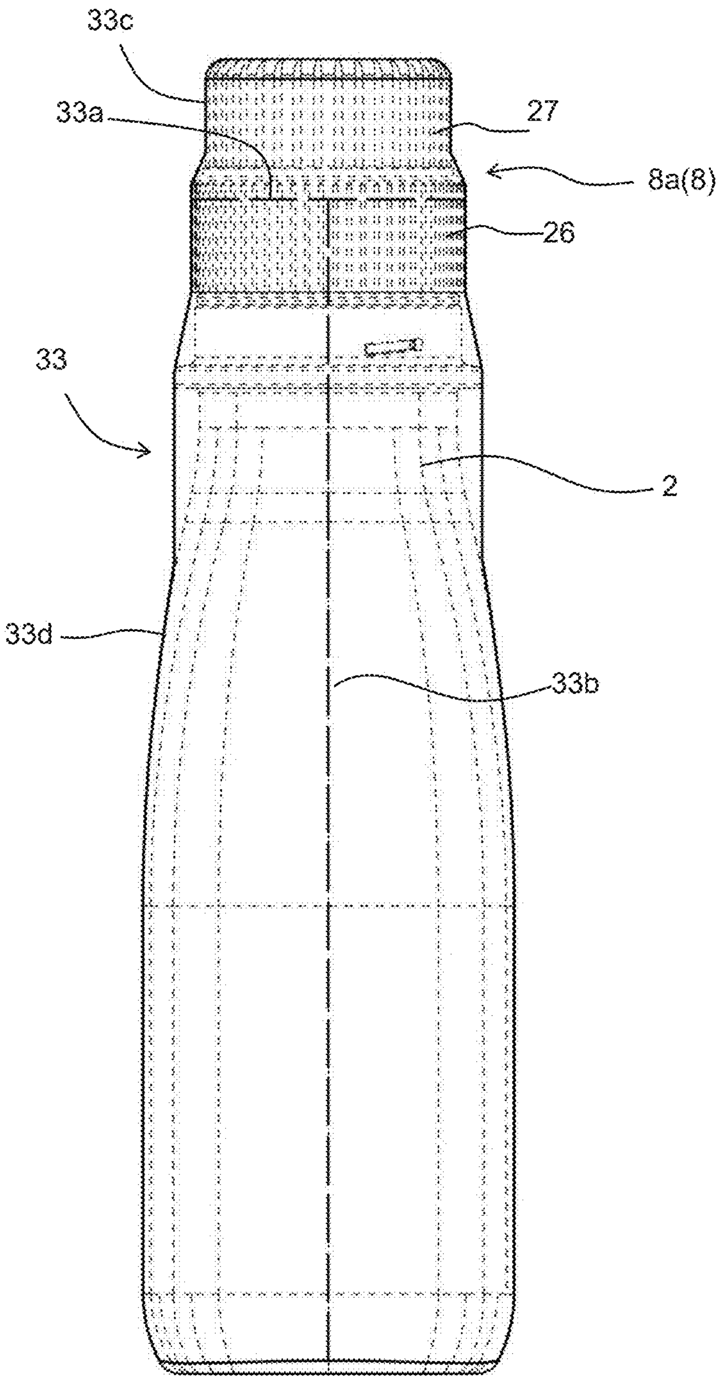
FIG. 9 is a front view showing a shrink film 33 attached in such a way to cover a container main body 2 and a mouth part attachment 8.

In this embodiment, as shown in FIG. 9, a shrink film 33 is used to prevent the occurrence of such problems. In this embodiment, the shrink film 33 covers the container main body 2, the inner plug 26, and the overcap 27 prior to unsealing. The shrink film 33 is provided with easy-to-tear lines 33*a* and 33*b*. The easy-to-tear lines 33*a* and 33*b* are lines such as perforations or half-cut lines that make it easy to cut the shrink film. The easy-to-tear line 33*a* is provided so as to extend in the circumferential direction of the inner plug 26 at the boundary between the inner plug 26 and the overcap 27 or at a position facing the inner plug 26. When a part of the shrink film 33 (i.e., the upper part 33*c* above the easy-to-tear line 33*a*) is removed along the easy-to-tear line 33*a*, the shrink film 33 still covers the inner plug 26 but no longer covers the overcap 27. In this state, it is difficult to grasp and rotate the inner plug 26, so that erroneous operations such as accidentally rotating the inner plug 26 is preventable. Note that instead of providing the easy-to-tear line 33*a*, the shrink film 33 may be attached in such a way that the upper edge of the shrink film 33 is located at the boundary between the inner plug 26 and the overcap 27 or at a position facing the inner plug 26. In this case, a covering state is achieved in which the inner plug 26 is covered but the overcap 27 is not covered, before a part of the shrink film 33 is removed.

Furthermore, the easy-to-tear line 33*b* is provided to facilitate the removal of the lower part 33*d* of the shrink film 33 below the easy-to-tear line 33*a*. It is preferable that the easy-to-tear line 33*b* is provided non-parallel to the easy-to-tear line 33*a* or perpendicular to the easy-to-tear line 33*a*. Moreover, it is preferable that the easy-to-tear line 33*b* is connected to the easy-to-tear line 33*a*, and preferably reaches the lower edge of the lower part 33*d*.

Note that the prevention of erroneous operations using a shrink film is also applicable to the cases where the cap 8*a* is not of a push-in type. If the cap 8*a* is of a screw type, the cap 8*a* is attached to the container main body 2 by screwing the cap 8*a* onto the opening of the outer shell 3. In addition, the prevention of erroneous operations using a shrink film is also applicable to the cases where the overcap is engaged with the inner plug 26 by, for example, snap engagement rather than screw engagement. Furthermore, it is also applicable to a configuration in which the inner bag 4 is lifted up by rotating the inner plug 26 in the loosening direction of left-hand threads.

<Shape of the Container Main Body 2>

In this embodiment, as shown in FIGS. 2 and 10 to 12, the shape of the body 6 of the container main body 2 becomes approximately square in cross-section (square with rounded corners) as the cross-section approaches the bottom part 7. More specifically, the cross-section is circular at the upper end of the shoulder part 6*b* as shown in FIG. 12A, approximately square at the trunk part main body 6*c* as shown in FIG. 12C, and a shape between a circle and an approximate square in the middle of the shoulder part 6*b* as shown in FIG. 12B. In other words, in the shoulder part 6*b*, the cross-section of the container main body 2 is expanded toward the bottom part 7, and the shape of the cross-section gradually approaches an approximate square. Further, the bottom part 7 is provided with a recess 7*a*.

Figure 12A:
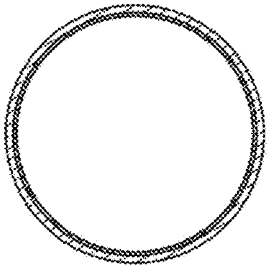
FIGS. 12A to 12C are cross-sectional views along line A-A, B-B, and C-C in FIG. 11, respectively.
Figure 12B:
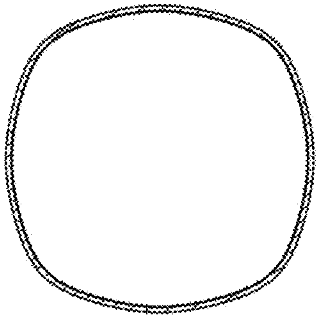
Figure 12C:
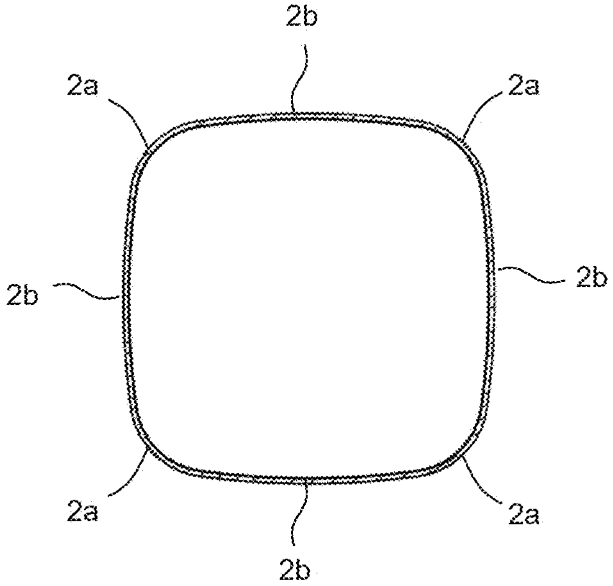
Figure 13:
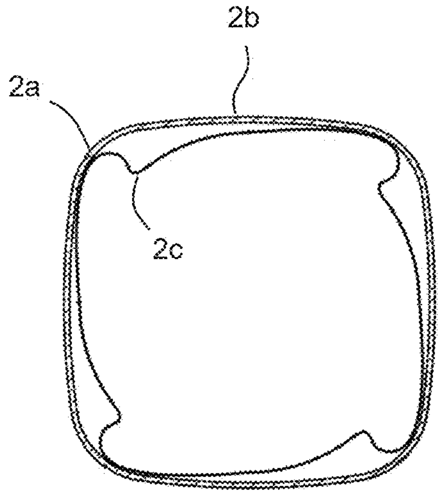
FIG. 13 is a cross-sectional view, corresponding to FIG. 12C, showing that a bent shape 2*c* is likely to be formed when the inner bag 4 is rotated with respect to the outer shell 3.

FIG. 12C shows a cross-section P at a distance of 0.2 J from the bottom surface of the container main body 2, where J is the total height of the container main body 2. In the cross-section P, the container main body 2 has three or more corner parts 2*a* that are separated among one another in the circumferential direction, and connecting parts 2*b* having a larger radius of curvature than that of the corner parts 2*a* are provided between the corner parts 2*a*. The inner bag 4 also has a shape similar to that of the container main body 2. Unless otherwise mentioned, the radius of curvature means the value at the outer surface of the container main body 2.

In the container main body 2 having such a shape, the connecting part 2*b* is more easily rotated than the corner part 2*a* when the inner bag 4 is rotated counterclockwise with respect to the outer shell 3. As a result, a bent shape 2*c* is likely to be formed near the boundary between the connecting part 2*b* and the corner part 2*a*. If the inner bag 4 is further rotated counterclockwise in this state, the diameter of the inner bag 4 is reduced in such a way that the corner parts 2*a* of the inner bag 4 are folded, making it easier to pull out the inner bag 4. In this embodiment, the number of corner parts 2*a* is four, but the same effects can be achieved even when the number of corner parts 2*a* is three, or five or more. The number of corner parts 2*a* is, for example, 3 to 12, preferably 3 to 6.

In cross-section P, the value of (L1−L2)/L1 is preferably 0.1 or less, where L1 is the length of the longest among the connecting parts 2*b*, and L2 is the length of the shortest among the connecting parts 2*b*. In this case, the lengths of all the connecting parts 2*b* are approximately the same, and the cross-section is an approximate regular polygonal. In this case, the corner parts 2*a* of the inner bag 4 are more easily folded since the connecting parts 2*b* are more easily rotated.

In the cross-section P, the value of R2/R1 is preferably three or more, where R1 is the minimum radius of curvature at the corner parts 2*a*, and R2 is the maximum radius of curvature at the connecting parts 2*b*. In this case, the corner parts 2*a* of the inner bag 4 are more easily folded. The connecting parts 2*b* may be flat surfaces, in which case the radius of curvature becomes infinite. It is preferable that the corner parts 2*a* are convex toward the outside of the container main body 2. The connecting parts 2*b* may be outwardly convex, flat, or inwardly convex. The value of R2/R1 is, for example, 3 to 1000, specifically, for example, 3, 4, 5, 6, 7, 8, 9, 10, 11, 12, 13, 14, 15, 16, 17, 18, 19, 20, 100, 500, and 1000, or may also be set to an arbitrary value between any two of these exemplary values, or equal to or above any of these exemplary values.

The radius of curvature R1 is, for example, 5 to 20 mm, specifically, for example, 5, 6, 7, 8, 9, 10, 11, 12, 13, 14, 15, 16, 17, 18, 19, 20 mm, or may also be set to an arbitrary value between any two of these exemplary values. The radius of curvature R2 is, for example, 30 mm or more, preferably 30 to 200 mm, and specifically, for example, 30, 40, 50, 60, 70, 80, 90, 100, 110, 120, 130, 140, 150, 160, 170, 180, 190, 200 mm, or may also be set to an arbitrary value between any two of these exemplary values, or equal to or above any of these exemplary values. The value of R1/R3 is, for example, 0.2 to 0.6, and specifically, for example, 0.20, 0.25, 0.30, 0.35, 0.40, 0.45, 0.50, 0.55, 0.60, or may also be set to an arbitrary value between any two of these exemplary values, where R3 is the radius of an equivalent circle of the container main body 2 at the cross-section P. The radius R3 of an equivalent circle is, for example, 15 to 40 mm, specifically, for example, 15, 16, 17, 18, 19, 20, 21, 22, 23, 24, 25, 26, 27, 28, 29, 30, 31, 32, 33, 34, 35, 36, 37, 38, 39, 40 mm, or may also be set to an arbitrary value between any two of these exemplary values.

In cross-section P, the value of T1/T2 is preferably 0.90 or less, where T1 is the minimum wall thickness of the inner bag 4 at the corner parts 2*a*, and T2 is the maximum wall thickness of the inner bag 4 at the connecting parts 2*b*. In cross-section P, the value of T1a/T2a is preferably 0.90 or less, where T1a is the average value of the wall thickness of the inner bag 4 at all corner parts 2*a*, and T2a is the average value of the wall thickness of the inner bag 4 at all connecting parts 2*b*. In this case, the corner parts 2*a* of the inner bag 4 are more easily folded. The values of T1/T2 and T1a/T2a are each, for example, 0.40 to 0.90, and specifically, for example, 0.40, 0.45, 0.50, 0.55, 0.60, 0.65, 0.70, 0.75, 0.80, 0.85, 0.90, or may also be set to an arbitrary value between any two of these exemplary values. The values of T1 and T1a are each preferably 95 μm or less. The values of T1 and T1a are each, for example, 50 to 95 μm, specifically, for example, 50, 55, 60, 65, 70, 75, 80, 85, 90, 95 μm, or may also be set to an arbitrary value between any two of these exemplary values, or equal to or below any of these exemplary values. The values of T2 and T2a are each, for example, 60 to 150 μm, specifically, for example, 60, 70, 80, 90, 100, 110, 120, 130, 140, 150 μm, or may also be set to an arbitrary value between any two of these exemplary values.

<Method for Discharging the Contents in the Double Container 1>

Figure 14:
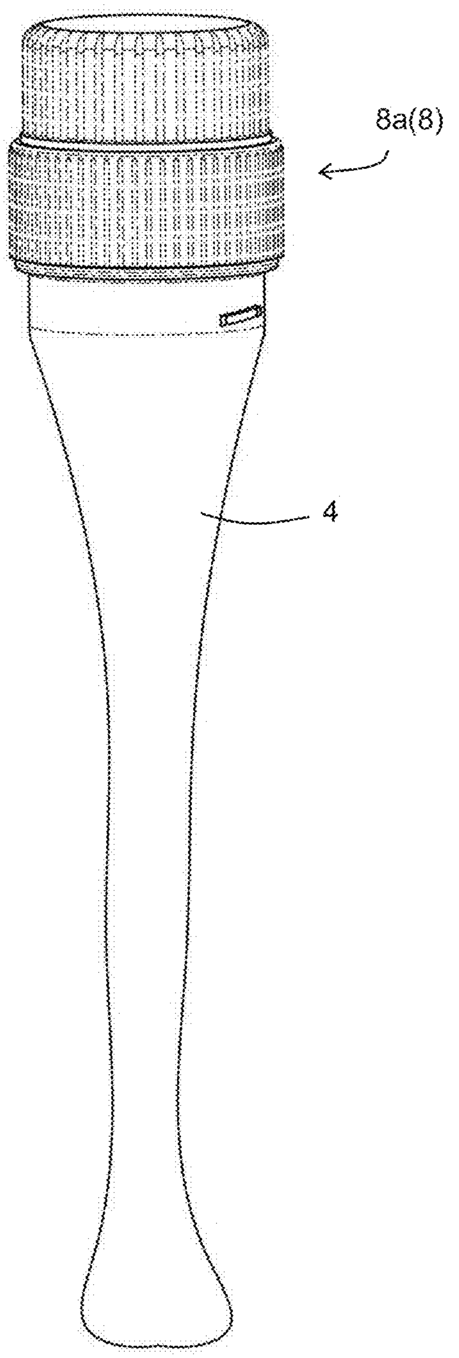
FIG. 14 is a perspective view of the inner bag 4 with a cap 8*a* attached.

As described above, in the double container 1 of this embodiment, the inner bag 4 is able to be pulled out from the container main body 2 using the mouth part attachment 8. As shown in FIG. 14, the mouth part attachment 8 remains engaged with the inner bag 4 after being pulled out.

In the case where the mouth part attachment 8 is a cap 8*a*, the inner bag 4 is pulled out from the container main body 2 with some of the contents remaining in the inner bag 4 (pullout step), and then the contents remaining in the inner bag 4 can be discharged (discharge step).

Since the inner bag 4 has higher flexibility than the outer shell 3, squeezing or compressing the inner bag 4 allows the contents to be easily discharged, and the amount of contents remaining when further discharge becomes impossible (hereinafter referred to as "final residual amount") is reducible.

Generally speaking, the final residual amount tends to increase as the viscosity increases, but according to the method of this embodiment, it is possible to prevent an increase in the final residual amount even when the viscosity is high. Therefore, the method of this embodiment has significant technical significance when the contents have a high viscosity (for example, 100 mPa·sec or more). The viscosity of the contents is, for example, 100 to 10,000 mPa·sec, and specifically, for example, 100, 200, 300, 400, 500, 600, 700, 800, 900, 1,000, 2,000, 3,000, 4,000, 5,000, 6,000, 7,000, 8,000, 9,000, and 10,000 mPa·sec, or may also be set to an arbitrary value between any two of these exemplary values, or equal to or above any of these exemplary values.

Figure 10:
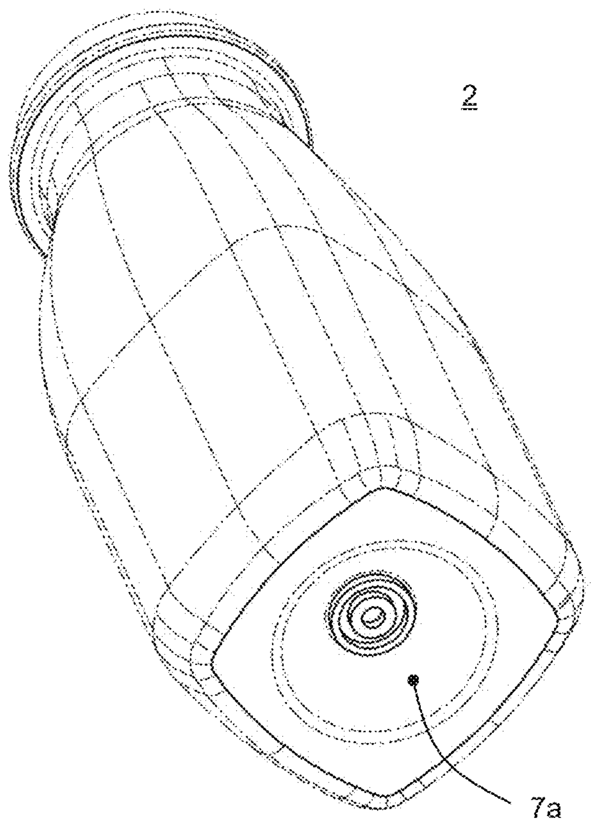
FIG. 10 is a perspective view of the container main body 2 viewed from below.
Figure 11:
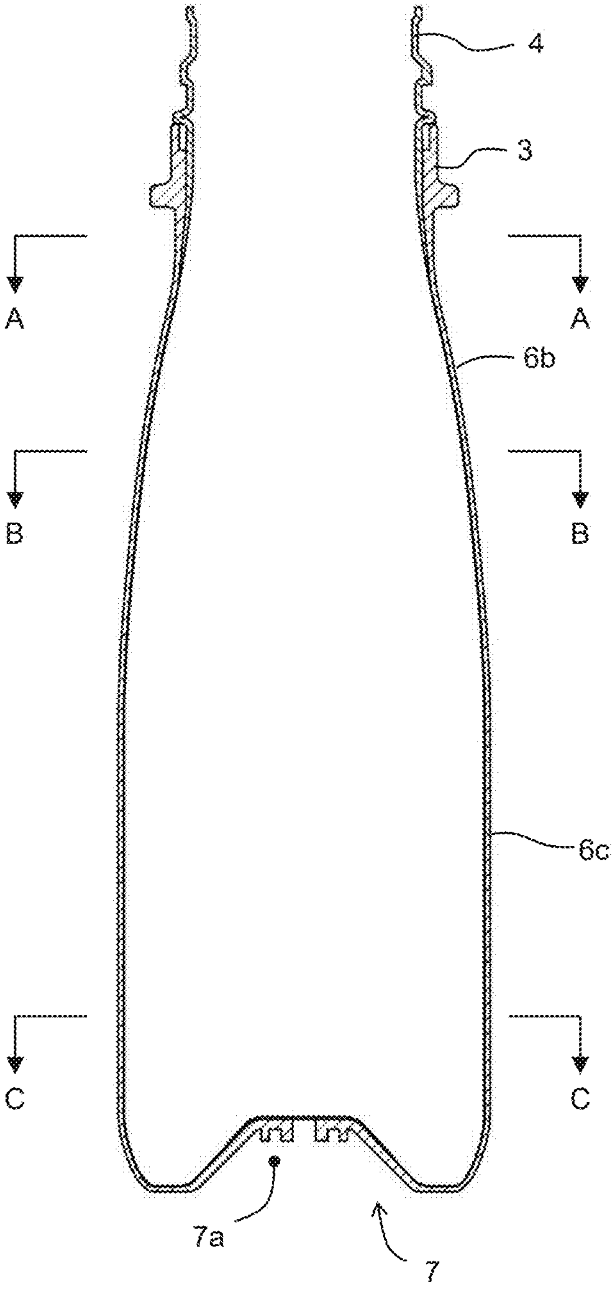
FIG. 11 is a vertical cross-sectional view, passing through the center of the mouth part 5, of the container main body 2.

As shown in FIG. 10, the bottom part 7 of the container main body 2 is provided with a truncated conical recess 7*a*. The recess 7*a* is also provided in the bottom part 7 of the inner bag 4. Since the truncated conical recess 7*a* has a circular cross-section (i.e, cross-section perpendicular to the central axis C), it is difficult to be deformed. As a result, if the truncated conical recess 7*a* exists in the inner bag 4, there is a risk that sufficient reduction in the final residual amount is not achievable. From this point of view, it is preferable to provide the bottom part of the container main body 2 with a recess having an oval-shape cross-section. Since such a recess is easier to deform than a recess with a circular cross-section, the final residual amount is further reducible.

Furthermore, if the engagement force between the inner bag 4 and the cap 8*a* is weak, there is a risk that the cap 8*a* comes off from the inner bag 4 after the inner bag 4 is pulled out, and the contents may leak out from the inner bag 4. On the other hand, in this embodiment, the axial engagement between the annular protrusions 4*c*5 and the mouth part attachment 8 is reinforced by the engaging protrusions 4*c*2, which makes the engagement between the cap 8*a* and the inner bag 4 strong and prevents the cap 8*a* from coming off from the inner bag 4.

<Thickness of the Inner Bag 4>

It is preferable that the inner bag 4 has a small wall thickness. This is because the smaller the wall thickness of the inner bag 4 is, the more flexible the inner bag 4 becomes, making it easier to reduce the final residual amount, and the amount of resin used becomes reducible.

From this point of view, it is preferable that the inner bag 4 includes a thin wall part having a wall thickness of 100 μm or less. Further, it is preferable that the thin wall part be provided at a position closer to the bottom part than the center of the trunk part 6 in the height direction. The wall thickness of the thin wall part is preferably 95 μm or less, more preferably 90 μm or less. The wall thickness of the thin wall part is, for example, 50 to 100 μm, specifically, for example, 50, 55, 60, 65, 70, 75, 80, 85, 90, 95, 100 μm, or may also be set to an arbitrary value between any two of these exemplary values.

<Layer structure of the inner bag 4>

Figure 15:
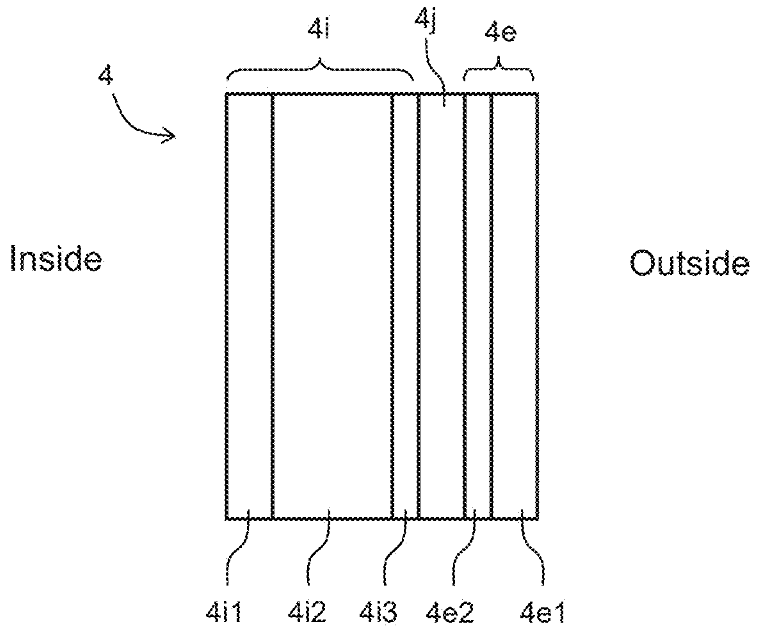
FIG. 15 is a diagram showing the layered structure of the inner bag 4.

The inner bag 4 may have a single layer structure or a multilayer structure. As shown in FIG. 15, the inner bag 4 preferably includes, in order from the inside of the inner bag 4, an inner layer 4*i*, a gas barrier layer 4*j*, and an outer layer 4*e*.

The inner layer 4*i* is a layer disposed nearer to the inside of the inner bag 4 than the gas barrier layer 4*j*. By providing the inner bag 4 with the inner layer 4*i*, exposure of the gas barrier layer 4*j* to moisture contained in the contents is prevented.

The wall thickness of the inner layer 4*i* is, for example, 5 to 60 μm, specifically, for example, 5, 10, 15, 20, 25, 30, 35, 40, 45, 50, 55, 60 μm, or may also be set to an arbitrary value between any two of these exemplary values. The inner layer 4*i* preferably includes, in order from the inside of the inner bag 4, an innermost layer 4*i*1, a repro layer 4*i*2, and an adhesive layer 413.

The innermost layer 4*i*1 is preferably made of a resin with excellent moisture barrier properties such as polyolefin (e.g., polyethylene, polypropylene) or PET. The innermost layer 4*i*1 is a layer that comes into contact with the contents in the inner bag 4, and is preferably made of new resin (hereinafter referred to as "virgin resin") rather than recycled resin in order to prevent contamination of the contents.

The repro layer 412 is preferably composed of a resin containing recycled resin, and is preferably composed of a mixed resin composed of recycled resin and virgin resin. By providing the repro layer 412, environmental load and container manufacturing costs can be reduced. The repro layer 412 is omittable if unnecessary.

Assuming that the entire mixed resin is 100% by mass, the mixed resin preferably contains 15 to 50% by mass of recycled resin (15, 20, 25, 30, 35, 40, 45, 50% by mass) and 50 to 85% by mass of virgin resin. (50, 55, 60, 65, 70, 75, 80, 85% by mass). The proportion of recycled resin and virgin resin may also be set to an arbitrary value between any two of these exemplary values in parentheses. The recycled resin is a resin obtained by recycling scraps generated during molding of the container main body 2. Since the scrap includes all the layers of the container main body 2, the recycled resin is a mixture of resin compositions constituting each of all the layers of the container main body 2.

The adhesive layer 413 is made of adhesive resin. Examples of adhesive resins include acid-modified polyolefin resins (e.g., maleic anhydride-modified polyethylene, maleic anhydride-modified polypropylene), and the like. By providing the adhesive layer 413, the adhesion between layers adjacent to the adhesive layer 413 is improved.

The outer layer 4*e* is a layer disposed nearer to the outside of the inner bag 4 than the gas barrier layer 4*j*. By providing the inner bag 4 with the outer layer 4*e*, exposure of the gas barrier layer 4*j* to moisture contained in the outside air is prevented.

The wall thickness of the outer layer 4*e* is, for example, 5 to 60 μm, specifically, for example, 5, 10, 15, 20, 25, 30, 35, 40, 45, 50, 55, 60 μm, or may also be set to an arbitrary value between any two of these exemplary values. The outer layer 4*e* preferably includes, in order from the outside of the inner bag 4, an outermost layer 4*e*1 and an adhesive layer 4*e*2.

The outermost layer 4*e*1 is preferably made of a resin with excellent moisture barrier properties such as polyolefin (e.g., polyethylene, polypropylene) or PET. The outermost layer 4*e*1 is a layer exposed to the outside of the inner bag 4, and is preferably made of virgin resin in order to prevent contamination of the external environment.

The description of the adhesive layer 4*e*2 is the same as that of the adhesive layer 413.

The value of the wall thickness of inner layer 4*i* divided by the wall thickness of outer layer 4*e* is, for example, preferably 0.2 to 5. Specifically, this value is, for example, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.5, 4.0, 4.5, 5.0, or may also be set to an arbitrary value between any two of these exemplary values.

If the inner layer 4*i* is thicker than the outer layer 4*e*, the gas barrier layer 4*j* is more reliably protectable from moisture in the contents. If the outer layer 4*e* is thicker than the inner layer 4*i*, the gas barrier layer 4*j* is more reliably protectable from external moisture.

In this embodiment, making the inner layer 4*i* thicker than the outer layer 4*e* and disposing the repro layer 412 in the inner layer 4*i* enable the repro layer 412 to be relatively thick. However, the repro layer 412 may be disposed in both the inner layer 4*i* and the outer layer 4*e*, or may be disposed only in the outer layer 4*e*. Further, the repro layer 412 may include a material, such as a post-consumer material, that may contain a component and/or a strong odor that is likely to migrate to the contents. In this case, in order to prevent component and/or odor migration, the repro layer 412 is preferably disposed in the outer layer 4*e*. In this case, the amount of resin used in the repro layer 412 may be increased by making the outer layer 4*e* thicker than the inner layer 4*i*.

The gas barrier layer 4*j* is made of gas barrier resin. In this specification, the gas barrier resin is a resin whose oxygen permeability is less than 50 cc/($m^2$*24 hours*atm) in an environment of 20° C. and 65% RH when formed into a 20 μm thick film. The oxygen permeability is, for example, 0 to 49 cc/($m^2$*24 hours*atm), and specifically, for example, 0.01, 0.1, 0.2, 0.5, 1, 2, 5, 10, 15, 20, 25, 30, 35, 40, 45, 49 cc/($m^2$*24 hours*atm), or may also be set to an arbitrary value between any two of these exemplary values, or equal to or below any of these exemplary values.

The ratio of oxygen permeability in an environment of 20° C. and 100% RH to oxygen permeability in an environment of 20° C. and 40% RH, of the gas barrier resin, is preferably 2 or more; equal to or above 5 is more preferable. The larger this value is, the lower the gas barrier property becomes at high humidity, and the technical significance of applying the present invention becomes significant. This value is, for example, 2 to 10,000, specifically, for example, 2, 5, 10, 20, 50, 100, 200, 1,000, 10,000, or may also be set to an arbitrary value between any two of these exemplary values, or equal to or above any of these exemplary values.

The gas barrier resin may be composed only of a resin with high gas barrier properties such as EVOH or polyamide, or may be a mixed resin of the above resins and another resin. The another resin can be adhesive resin. By blending adhesive resin into the gas barrier layer 4*j*, the adhesive layers 4*i*3 and 4*e*2 can be omitted, and the number of layers constituting the inner bag 4 can be reduced.

The wall thickness of the gas barrier layer 4*j* is, for example, 20 to 100 μm, specifically, for example, 20, 30, 40, 50, 60, 70, 80, 90, 100 μm, or may also be set to an arbitrary value between any two of these exemplary values.

1-2. Method for Manufacturing Dual Container 1

Figure 16:
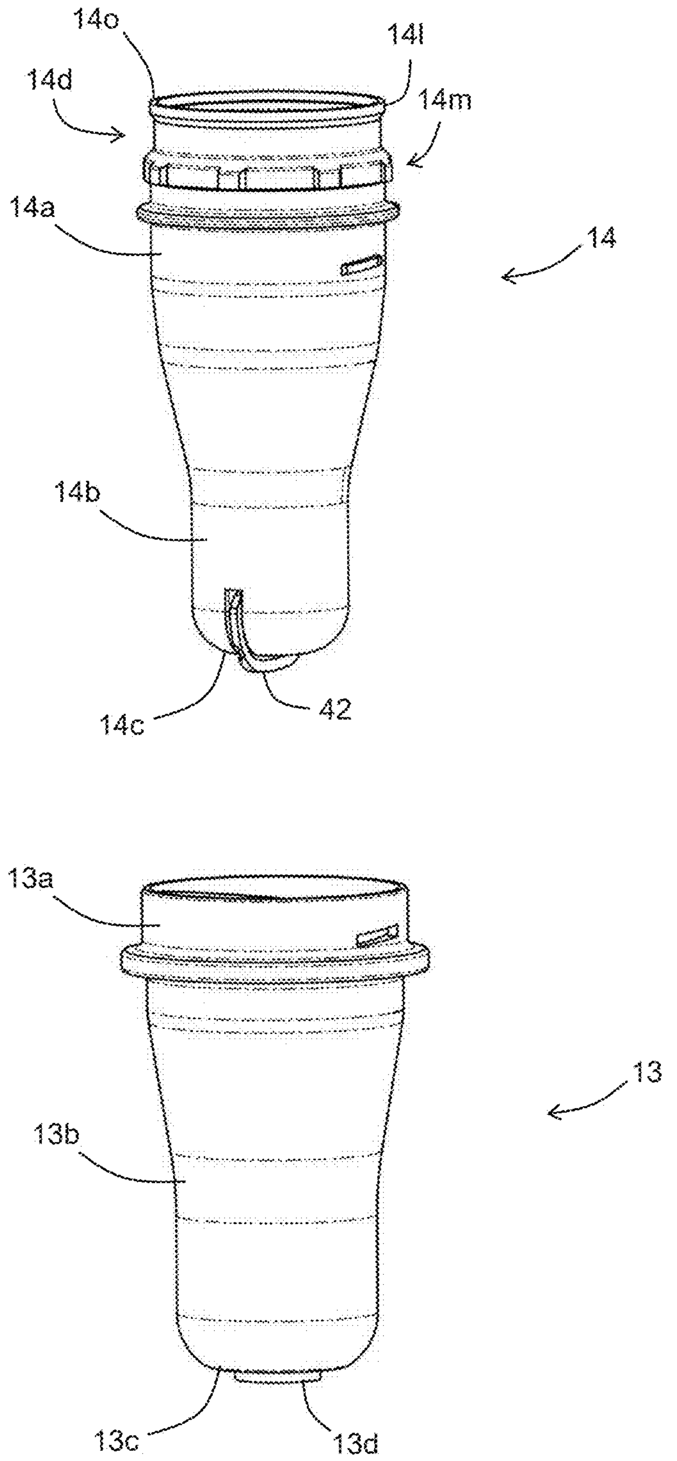
FIG. 16 is a perspective view showing a state in which the inner preform 14 and the outer preform 13 are separated.
Figure 17A:
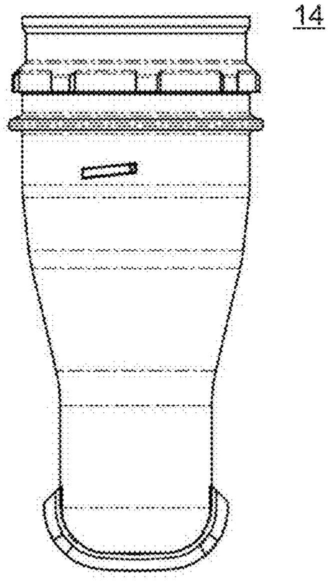
FIG. 17A is a front view of the inner preform 14.
Figure 17B:
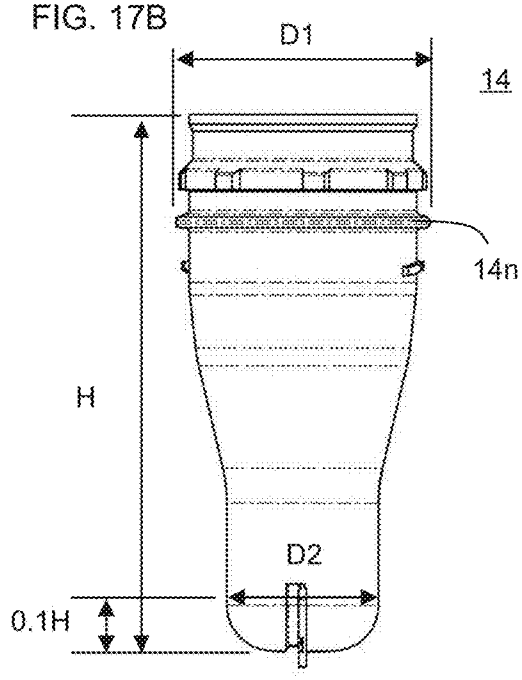
FIG. 17B is a right side view of the inner preform 14.
Figure 17C:
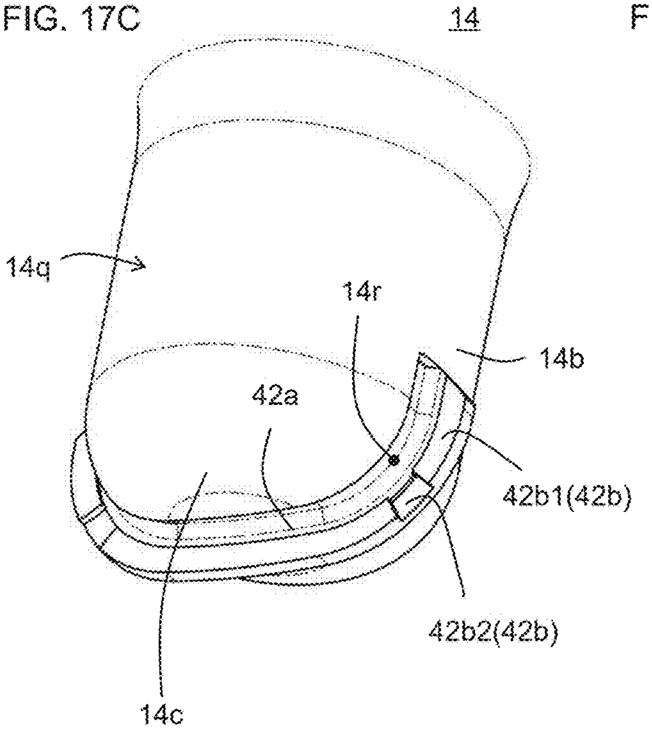
FIGS. 17C to 17D show the vicinity of the bottom part of the inner preform 14, seen diagonally from below.
Figure 17D:
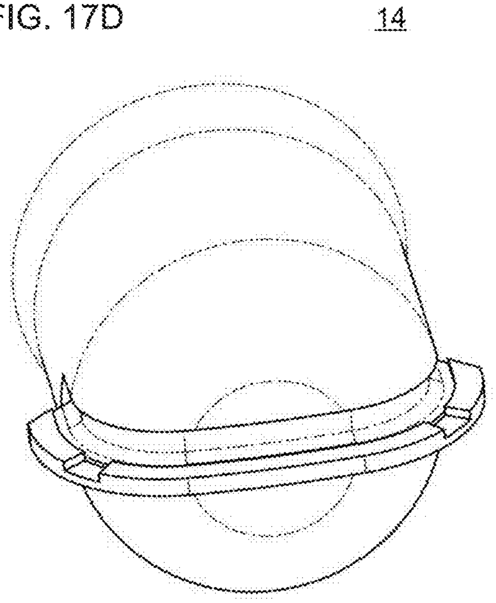
Figure 18:
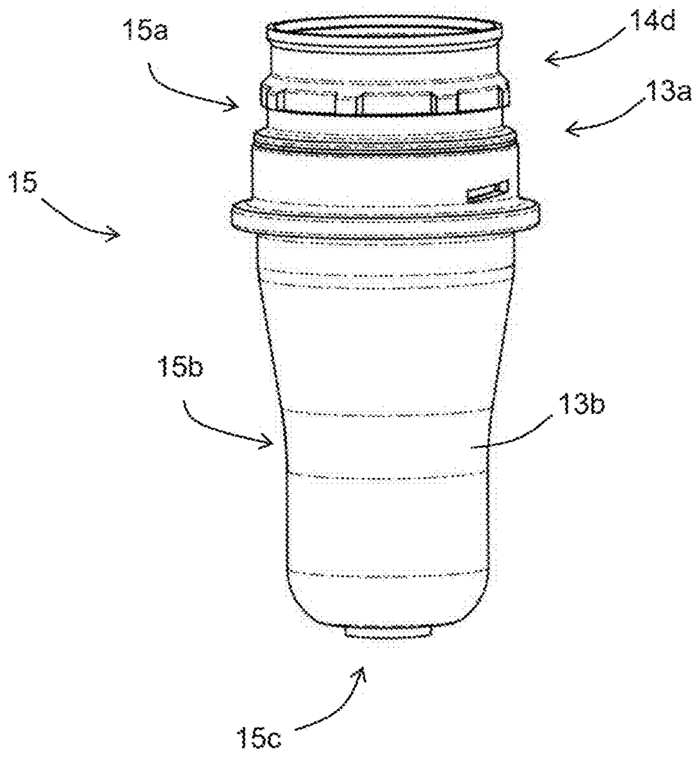
FIG. 18 is a perspective view showing a preform 15 formed of an outer preform 13 covering the inner preform 14.

As shown in FIGS. 16 to 18, the container main body 2 can be formed by heating a preform 15 and performing biaxial stretch blow molding.

<Configurations of the Inner Preform 14, Outer Preform 13, and Preform 15>

In one example, the preform 15 can be constructed by covering an inner preform 14, which will become the inner bag 4, with an outer preform 13, which will become the outer shell 3.

As shown in FIG. 16, the inner preform 14 has a bottomed tubular shape and includes a mouth part 14*a*, a trunk part 14*b*, and a bottom part 14*c*. A protrusion 14*d* is provided at the open end of the mouth part 14*a*. The protrusion 14*d* does not deform during molding and becomes the protrusion 4*c* in its original shape. Hence, the descriptions of the protrusion 4*c* also apply to the protrusion 14*d*. The protrusion 14*d* is provided with an engaging part 14*m*. The engaging part 14*m* becomes the engaging part 4*m* after molding and is used for pulling out the inner bag 4. The bottom part 14*c* is provided to close the lower end of the trunk part 14*b*. A positioning pin (not shown) may be provided on the bottom part 14*c*.

As shown in FIG. 16, the outer preform 13 has a bottomed tubular shape and includes a mouth part 13*a*, a trunk part 13*b*, and a bottom part 13*c*. The bottom part 13*c* is provided to close the lower end of the trunk part 13*b*. The bottom part 13*c* is provided with an annular protrusion 13*d* and a positioning hole (not shown).

As shown in FIG. 18, the preform 15 can be formed by covering the inner preform 14 with the outer preform 13. If the inner preform 14 is provided with a positioning pin, this positioning pin can be inserted into the positioning hole of the outer preform 13 to position the inner preform 14 and the outer preform 13 relative to each other. In the preform 15, the opening 14*a* and the opening 13*a* face each other, and the trunk part 14*b* and the trunk part 13*b* face each other.

The mouth parts 13*a* and 14*a* become the mouth part 15*a* of the preform 15, the trunk parts 13*b* and 14*b* become the trunk part 15*b* of the preform 15, and the bottom parts 13*c* and 14*c* become the bottom part 15*c* of the preform 15. The trunk part 15*b* and bottom part 15*c* are mainly stretched in biaxial stretch blow molding.

<Materials and Methods for Manufacturing the Inner Preform 14 and Outer Preform 13>

The inner preform 14 and the outer preform 13 can be formed by direct blow molding, injection molding, or the like of a thermoplastic resin such as polyester (e.g., PET) or polyolefin (e.g., polypropylene, polyethylene). In one example, the inner preform 14 is made of polyolefin (e.g., polypropylene) and the outer preform 13 is made of PET. The polyolefin used for the inner preform 14 is preferably polypropylene rather than polyethylene. This is because the temperature at which polypropylene is suitable for biaxial stretch blow molding is closer to that of PET than polyethylene.

<Manufacture of the Inner Preform 14 by Direct Blow Molding>

It is preferable that the inner preform 14 is a direct blow molded body formed by direct blow molding using a molten tubular parison. In direct blow molding, it is easier to make the inner bag 4 thinner than in injection molding, so by forming the inner preform 14 by direct blow molding, it is possible to make the inner bag 4 thinner. Further, in order to form the inner bag 4 having a multilayer structure, the inner preform 14 preferably includes, in order from the inside, an inner layer 14*i*, a gas barrier layer 14*j*, and an outer layer 14*e*, as shown in FIG. 23. However, it is not easy to form the inner preform 14 with such a structure by multilayer injection molding, and if a gate is provided on the bottom part 14*c* of the inner preform 14, for example, the resin constituting the gas barrier layer 14*j* may not reach the open end of the inner preform 1, potentially causing the deterioration of the gas barrier capabilities. In particular, the smaller the wall thickness of the inner preform 14, the more difficult it becomes for the resin to flow, and the above problem becomes more pronounced. On the other hand, in direct blow molding, molding is performed using a tubular parison having structures corresponding to the inner layer 14*i*, the gas barrier layer 14*j*, and the outer layer 14*e*, making it easy to provide the gas barrier layer 14*j* over the entire inner preform 14.

Figure 19:
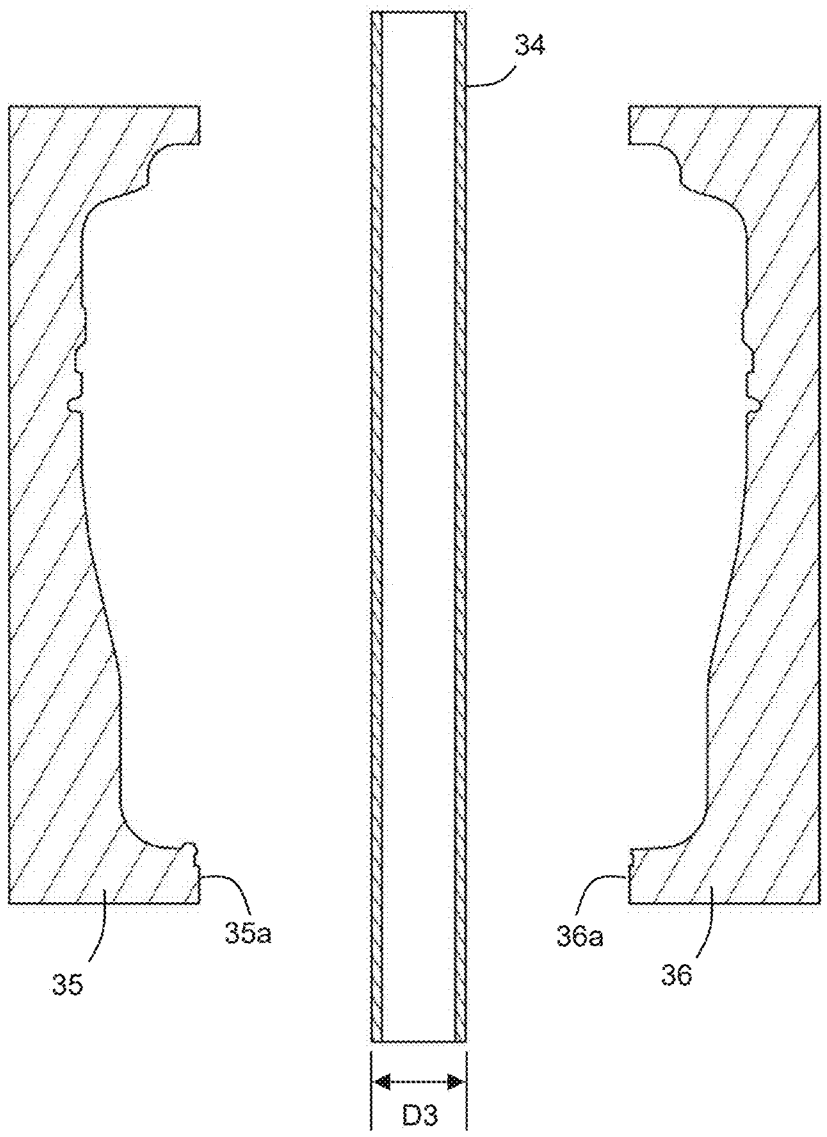
FIG. 19 is a cross-sectional view of a tubular parison 34 disposed between split molds 35 and 36 that are in an open state.
Figure 20:
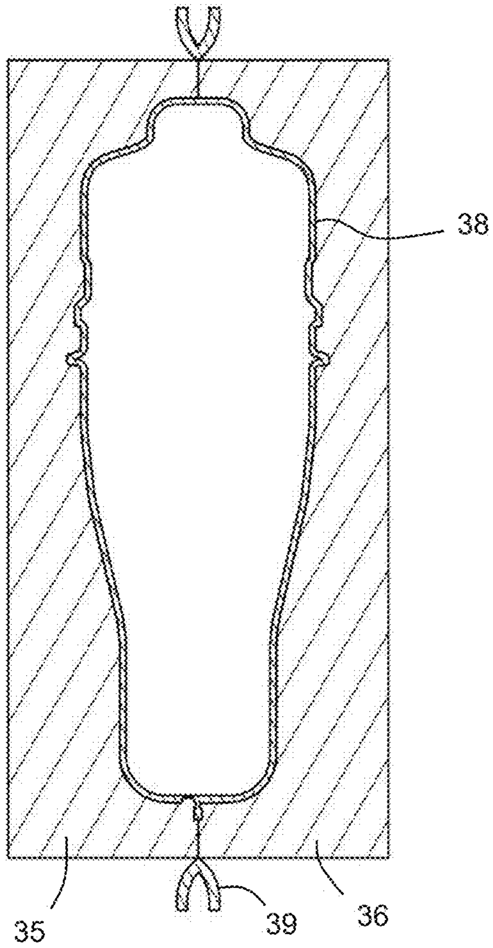
FIG. 20 is a cross-sectional view of a molded body 38 formed by closing the split molds 35 and 36 and blowing air into them.
Figure 21A:
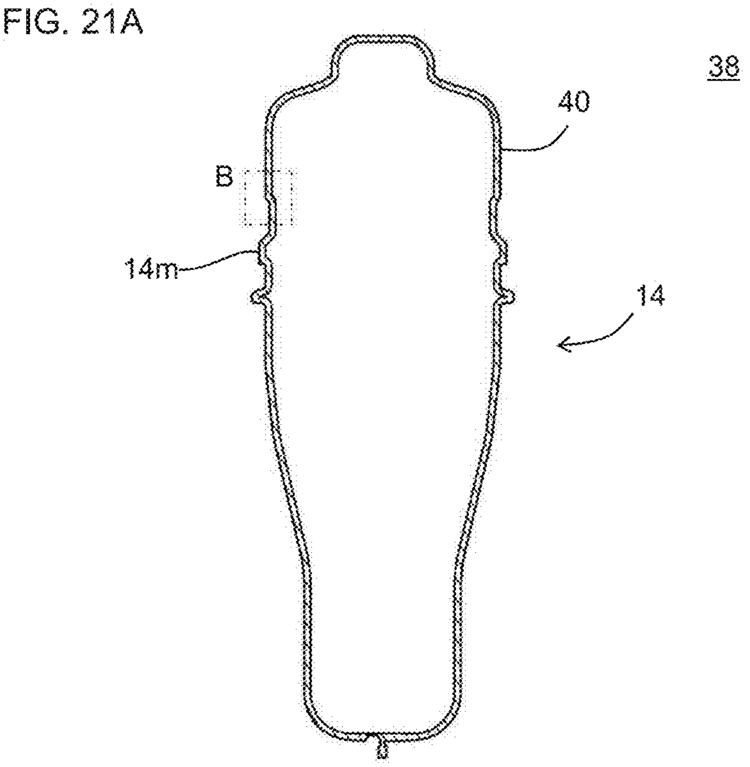
FIG. 21A is a cross-sectional view of the molded body 38 taken out from the split molds 35, 36 with the burr 39 removed, following the state shown in FIG. 20.
Figure 21B:
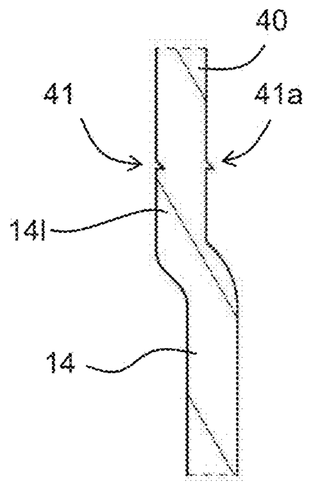
FIG. 21B is an enlarged view of region B in FIG. 21A.

In direct blow molding, a molten tubular parison 34 is placed between split molds 35 and 36 in an open state as shown in FIG. 19. Then, the split molds 35 and 36 are closed as shown in FIG. 20 to turn the tubular parison 34 into a bag-shaped parison. Then, air is blown into the bag-shaped parison to form it into a shape along the shaping surfaces of the split molds 35 and 36. A molded body 38 with burrs 39 is formed by direct blow molding. Thereafter, the molded body 38 is taken out from the split molds 35 and 36, and the burrs 39 are removed, thereby obtaining the molded body 38 shown in FIG. 21.

The molded body 38 has a shape in which a bag part 40 is connected to the open end 140 of the inner preform 14. An annular recess 41 is provided at the boundary between the inner preform 14 and the bag part 40 to indicate a cutting site.

Figure 22A:
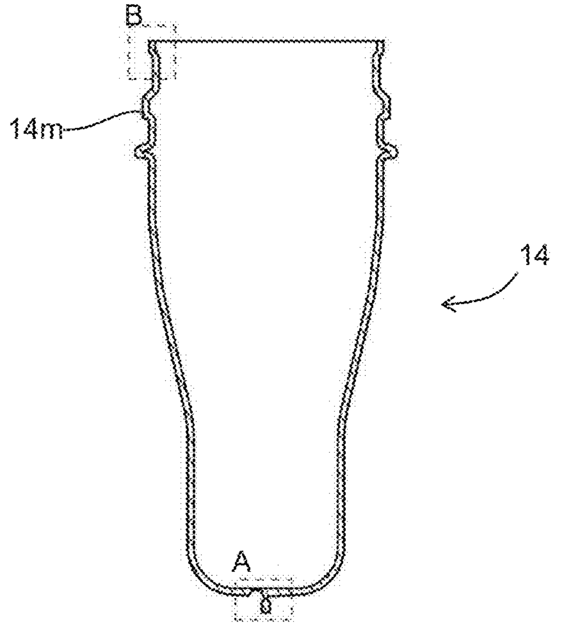
FIG. 22A is a cross-sectional view of the inner preform 14 formed by removing the bag part 40 following the state shown in FIG. 21.
Figure 22B:
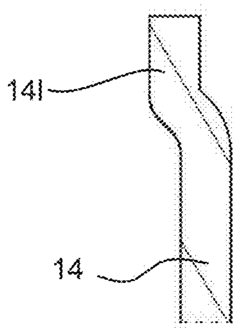
FIG. 22B is an enlarged view of region B in FIG. 22A.
Figure 22C:
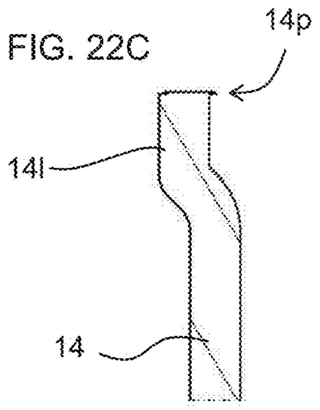
FIG. 22C is a diagram, corresponding to FIG. 22B, showing a case where the burr 14*p* remains at the open end of the inner preform 14.

Next, as shown in FIG. 22, the molded body 38 is cut along the annular recess 41 and the bag part 40 is removed to obtain the inner preform 14. The annular recess 41 is a recess on the outside of the molded body 38, but becomes an annular protrusion 41*a* on the inside of the molded body 38. When the molded body 38 is cut along the annular recess 41, the annular protrusion 41*a* remains partially. As a result, as shown in FIG. 22C, a burr 14*p* may protrude toward the inside of the inner preform 14, or a burr 14*p* may be formed during cutting even if the annular protrusion 41*a* is not formed inside the molded body 38. If the enlarged diameter structure 141 is not provided at the open end 140 of the inner preform 14, there is a risk that the burr 14*p* may prevent the outer circumferential surface of the inner tube 28*b* of the inner plug 26 and the inner circumferential surface of the inner bag 4 from coming into close contact with each other. However, in this embodiment, the burr 14*p* is formed in the enlarged diameter structure 141, so the burr 14*p* does not impede the above-mentioned close contact.

<Relationship Between the Shape of the Inner Preform 14 and the Outer Diameter of the Tubular Parison 34>

The value of D1/D3 is preferably 1.5 or more, where D1 is the outer diameter of the part, of the inner preform 14, having the largest outer diameter at the mouth part 14*a* (the outer diameter at the abutting flange 14*n*) as shown in FIG. 17B, and D3 is the outer diameter of the tubular parison 34 as shown in FIG. 19. As the value of D1/D3 becomes larger, the blow ratio when forming the inner preform 14 becomes larger, so the wall thickness of the mouth part 14*a* of the inner preform 14 tends to become smaller. If the wall thickness of the mouth part 14*a* of the inner preform 14 is small, the rigidity of the mouth part 14*a* becomes small. As a result, when cutting the molded body 38 along the annular recess 41, the mouth part 14*a* can be deformed, potentially making it difficult to perform cutting accurately. On the other hand, in this embodiment, the open end 140 of the inner preform 14 is provided with the enlarged diameter structure 141 that prevents the deformation of the opening 14*a*, so that the deformation of the opening 14*a* is prevented.

The value of D1/D3 is preferably 2 or more, and more preferably 2.5 or more. The value of D1/D3 is, for example, 1.5 to 4.0, specifically, for example, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, or may also be set to an arbitrary value between any two of these exemplary values. The value of D1 is, for example, 25 to 40 mm, specifically, for example, 25, 26, 27, 28, 29, 30, 31, 32, 33, 34, 35, 36, 37, 38, 39, 40 mm, or may also be set to an arbitrary value between any two of these exemplary values. The value of D3 is, for example, 8 to 25 mm, specifically, for example, 8, 9, 10, 11, 12, 13, 14, 15, 16, 17, 18, 19, 20, 21, 22, 23, 24, 25 mm, or may also be set to an arbitrary value between any two of these exemplary values.

The inner preform 14 preferably has a wall thickness of 1.5 mm or less at the open end 140. In this case, the technical significance of providing the enlarged diameter structures 141 and 4*k* is significant, since the rigidity of the opening 14*a* of the inner preform 14 and the opening 5 of the inner bag 4 is particularly low. This wall thickness is, for example, 0.5 to 1.5 mm, specifically, for example, 0.5, 0.6, 0.7, 0.8, 0.9, 1.0, 1.1, 1.2, 1.3, 1.4, 1.5 mm, or may also be set to an arbitrary value between any two of these exemplary values.

The value of D2/D1 is preferably 0.35 or more, and more preferably 0.50 or more, where D2 is the outer diameter of the inner preform 14 at a height position where the height from the bottom part 14*c* of the inner preform 14 is 0.1H, and H is the total height of the inner preform 14 as shown in FIG. 17B. When the split molds 35 and 36 are closed, the tubular parison 34 is pinched between the pinch-off parts 35*a* and 36*a* of the split molds 35 and 36. As a result, the inner surfaces of the tubular parison 34 are welded together to form the sealing part.

It is not desirable to form the sealing part on the body part 14*b* of the inner preform 14 because the sealing part is unsightly. The larger the value of D2 is, the more unlikely it is to form a sealing part in the trunk part 14*b* of the inner preform 14. Hence, the applicable outer diameter of the tubular parison 34 becomes larger. Moreover, the smaller the value of D1 is, the smaller the blow ratio at the mouth part 14*a* of the inner preform 14 becomes, and the thicker the mouth part 14*a* becomes. As a result, the rigidity of the opening 5 of the inner bag 4 increases, making it easier to pull out the inner bag 4.

The value of D2 is, for example, 12 to 30 mm, specifically, for example, 12, 13, 14, 15, 16, 17, 18, 19, 20, 21, 22, 23, 24, 25, 26, 27, 28, 29, and 30 mm, or may also be set to an arbitrary value between any two of these exemplary values.

Furthermore, the value of D2/D1 is preferably 0.8 or less. If the value of D2/D1 is too large, the wall thickness of the trunk part 6 of the inner bag 4 tends to increase, and the ability to discharge the contents may deteriorate.

The value of D2/D1 is, for example, 0.35 to 1.0, specifically, for example, 0.35, 0.40, 0.45, 0.50, 0.55, 0.60, 0.65, 0.70, 0.75, 0.80, 0.85, 0.90, 0.95, 1.00, or may also be set to an arbitrary value between any two of these exemplary values.

The value of D2/D3 is preferably 1.1 or more, and more preferably, 1.4 or more. In this case, a sealing part is less likely to be formed on the trunk part 14*b* of the inner preform 14, and the aesthetic appearance of the inner preform 14 is improved. The value of D2/D3 is, for example, 1.1 to 2.0, specifically, for example, 1.1, 1.2, 1.3, 1.4, 1.5, 1.6, 1.7, 1.8, 1.9, and 2.0, or may also be set to an arbitrary value between any two of these exemplary values.

<Protruding Sealing Part 42>

Figure 23A:
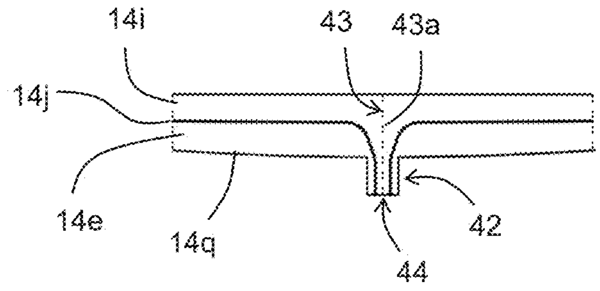
FIG. 23A is an enlarged view of a part corresponding to region A in FIG. 22A, in the case where the protruding sealing part 42 is not provided with an extension prevention structure.

Because sealing parts formed by welding the inner surfaces of the tubular parison 34 together may not have sufficient strength, it is preferable that the sealing part 43 is made to protrude from the main body part 14*q* of the inner preform 14 to form a protruding sealing part 42, as shown in FIG. 23A. The protruding sealing part 42 is formed by welding the inner surfaces of a tubular parison 34 together, and protrudes from the main body part 14*q* of the inner preform 14. The main body part 14*q* refers to a part of the inner preform 14 other than the protruding sealing part 42. As shown in FIG. 23A, protruding the sealing part 43 to form the protruding sealing part 42 increases the area of the sealing surface 43*a*, which increases the sealing strength of the sealing part 43.

In the case where the inner preform 14 includes an inner layer 14*i*, a gas barrier layer 14*j*, and an outer layer 14*e* in order from the inside as shown in FIG. 23A, the opposing inner layers 14*i* are welded to each other at the sealing surface 43*a*. However, the gas barrier layers 14*j* are not welded to each other, and also the outer layers 14*e* are not welded to each other. Hence, in the vicinity of the sealing part 43, a non-barrier area 44, in which the gas barrier layer 14*j* is not provided, is provided. The wider the non-barrier area 44 is, the lower the gas barrier capabilities against the contents becomes.

Figure 23B:
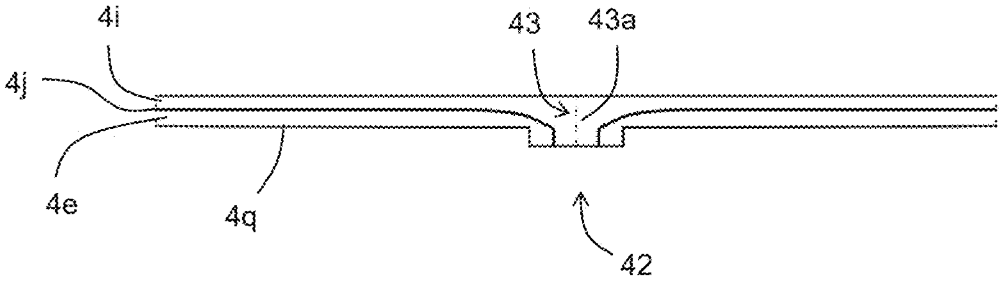
FIG. 23B shows a part corresponding to FIG. 23A following biaxial stretch blow molding.

When biaxial stretch blow molding is performed by covering such an inner preform 14 with the outer preform 13, additional stretching occurs at the protruding sealing part 42. As a result, the structure becomes as shown in FIG. 23B, and the non-barrier area 44 becomes wider, further deteriorating the gas barrier capabilities. The inner layer 14*i*, the gas barrier layer 14*j*, and the outer layer 14*e* of the main body part 14*q* of the inner preform 14 are the inner layer 4*i*, the gas barrier layer 4*j*, and the outer layer 4*e* of the main body part 4*q* of the inner bag 4, respectively. Furthermore, in the configurations shown in FIGS. 23A and 23B, since the stretching in the sealing part 43 is not prevented, force in the direction of peeling off the sealing surface 43*a* is applied from both sides of the sealing surface 43*a*, potentially causing the sealing surface 43*a* to be peeled off.

Figure 24A:
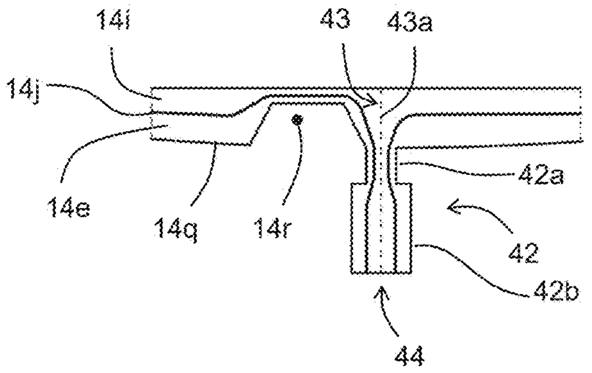
FIG. 24A is an enlarged view of area A in FIG. 22A.
Figure 24B:
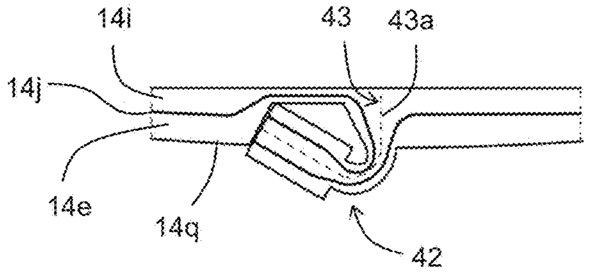
FIG. 24B shows an extension prevention structure, formed by bending the protruding sealing part 42 following the state shown in FIG. 24A.
Figure 24C:
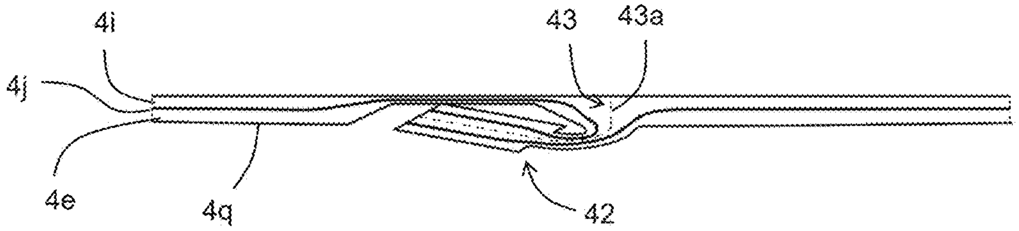
FIG. 24C shows a biaxial stretch blow molding of the inner preform 14 having the extension prevention structure, corresponding to the part shown in FIG. 24B.

In order to solve this problem, in this embodiment, the protruding sealing part 42 as shown in FIG. 24A is formed by direct blow molding, and then the protruding sealing part 42 is bent as shown in FIG. 24B to form a bent structure. The protruding sealing part 42 can be bent, for example, after being reheated and softened.

When biaxial stretch blow molding is performed by covering such an inner preform 14 with the outer preform 13, stretching at the sealing part 43 is prevented by the bent protruding sealing part 42. In addition, even if the sealing part 43 is stretched, the non-barrier area 44 does not expand, and the deterioration of gas barrier capabilities is prevented. Hence, in this embodiment, the bent protruding sealing part 42 serves as an extension prevention structure that prevents the sealing part 43 from being stretched during biaxial stretch blow molding.

It is preferable that the main body part 14*q* is provided with a groove 14*r* along the protruding sealing part 42. In this case, by bending and housing the protruding sealing part 42 in the groove 14*r*, the amount of protrusion of the protruding sealing part 42 from the main body part 14*q* is reduced, and the part corresponding to the protruding sealing part 42 becomes less noticeable even after biaxial stretch blow molding.

It is preferable that the protruding sealing part 42 includes a base part 42*a* and an outer part 42*b* in order from the main body part 14*q* side, and that the outer part 42*b* includes a part having a larger wall thickness than the base part 42*a*. According to such a configuration, it is easy to bend the protruding sealing part 42 at the base part 42*a*. Further, the protruding sealing part 42 is preferably provided in such a way to span the bottom part 14*c* and the trunk part 14*b* of the main body part 14*q*, as shown in FIGS. 17C to 17D. The outer part 42*b* includes a thick wall part 42*b*1 and a thin wall part 42*b*2 having a smaller wall thickness than the thick wall part 42*b*1, and the thin wall part 42*b*2 is provided at a position adjacent to the boundary between the bottom part 14*c* and the trunk part 14*b*. If the thick wall part 42*b*1 is provided at the boundary between the bottom part 14*c* and the trunk part 14*b*, trying to bend the protruding sealing part 42 results in the thick wall parts 42*b*1 interfering with each other, making it difficult to bend the protruding sealing part 42. By providing the thin wall part 42*b*2 at the boundary between the bottom part 14*c* and the trunk part 14*b*, the protruding sealing part 42 becomes easily bendable even when the protruding sealing part 42 is provided across the bottom part 14*c* and the trunk part 14*b*. It is preferable that the thick wall part 42*b*1 has a larger wall thickness than the base part 42*a*, and that the thin wall part 42*b*2 has a smaller wall thickness than the base part 42*a*.

<Surface Treatment of the Inner Preform 14>

It is possible to make the inner preform 14 thinner by forming it by direct blow molding than by injection molding. As a result, it is possible to make the inner bag 4 thinner, and the inner bag 4 may include a thin wall part having a wall thickness of 100 μm or less. The adhesion between the inner bag 4 and the outer shell 3 tends to become stronger as the inner bag 4 becomes thinner. Further, depending on the combination of materials for the inner preform 14 and the outer preform 13, the shrinkage rate of the inner bag 4 may be larger than the shrinkage rate of the outer shell 3 in the cooling step after biaxial stretch blow molding.

In such a case, the inner bag 4 does not shrink uniformly, but selectively shrinks in parts of the inner bag 4 where the adhesion to the outer shell 3 is relatively weak. As a result, wrinkles may be formed in the inner bag 4 and the appearance may become poor.

In order to solve such a problem, in this embodiment, the inner preform 14 is provided with an uneven shape, or has a lubricant, on the outer surface of the region that includes a part corresponding to the thin wall part. Both the uneven shape and the lubricant reduce the adhesion between the inner bag 4 and the outer shell 3, and hence, the inner bag 4 contracts uniformly and wrinkles are prevented.

Methods for forming the uneven shape include post-processing the inner preform 14 to form the uneven shape, reflecting the uneven shape, which is formed on the shaping surface of split molds, on the inner preform 14, and mixing particles into the resin constituting the inner preform 14 and reflecting the shape of the particles on the surface of the inner preform 14 to form an uneven shape.

Examples of methods for forming the uneven shape by post-processing include rubbing the surface of the inner preform 14 with a sandpaper, and sandblasting the inner preform 14. Examples of methods for forming an uneven shape on the shaped surface include rubbing the shaped surface with a sandpaper, and sandblasting the shaped surface. Examples of the particles to be mixed with the resin include inorganic particles (e.g., synthetic silicates such as talc and synthetic zeolites). The particle size is, for example, 1 to 50 μm, and the particle proportion is, for example, 0.5 to 10% by mass, preferably 1 to 5% by mass. Since the adhesion between the inner bag 4 and the outer shell 3 is significantly reduced when the uneven shape is formed by post-processing, this method is preferable.

Any lubricant that has a peeling effect can be used. The lubricant may be applied to the outer surface of the inner preform 14, or the lubricant may be mixed with the resin constituting the inner preform 14 so that it is present on the outer surface of the inner preform 14 through bleed-out.

It is preferable that the uneven shape has a random shape. Further, it is preferable that the uneven shape has an arithmetic mean roughness Ra of 1 to 200 μm. In this case, the adhesion between the inner bag 4 and the outer shell 3 is particularly effectively reducible. The value of Ra is specifically, for example, 1, 2, 3, 4, 5, 6, 7, 8, 9, 10, 11, 12, 13, 14, 15, 16, 17, 18, 19, 20, 30, 40, 50, 60, 70, 80, 90, 100, 150, 200 μm, or may also be set to an arbitrary value between any two of these exemplary values. Arithmetic mean roughness Ra is measurable in accordance with JIS B 0601:2013.

Other embodiments are described below. The descriptions of the first embodiment are also applicable to the embodiments below unless doing so contradicts the scope of the descriptions.

2. Second Embodiment

Figure 25A:
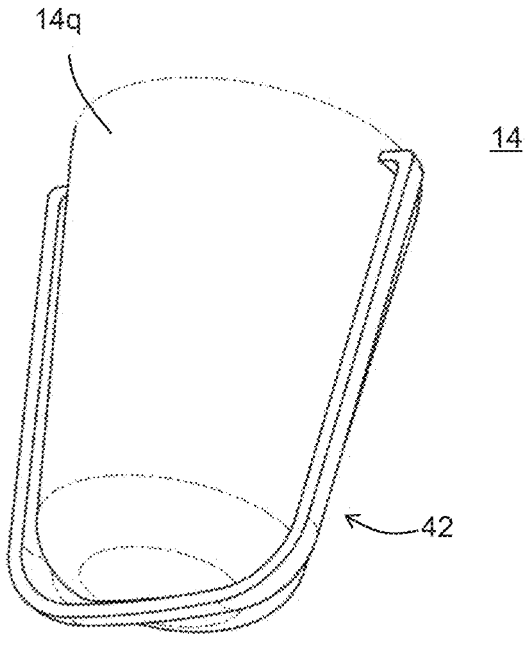
FIG. 25A is a perspective view of the vicinity of the bottom part of the inner preform 14 in the second embodiment of the present invention.
Figure 25B:
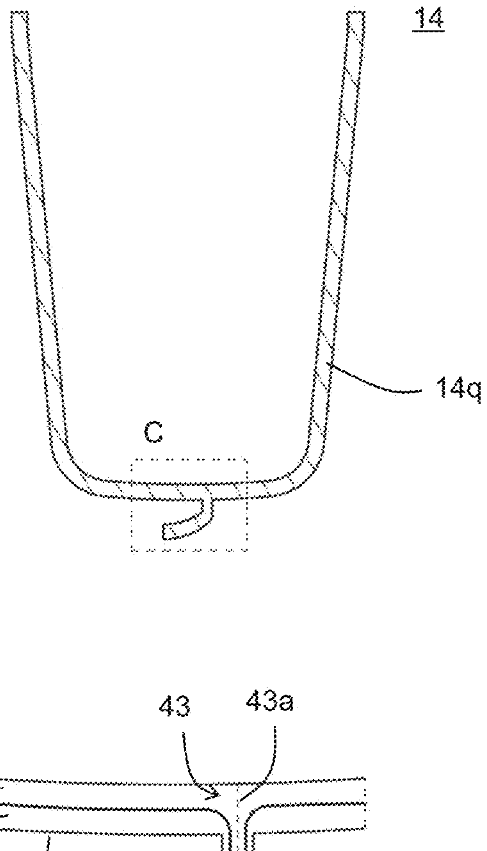
FIG. 25B is a cross-sectional view, perpendicular to the longitudinal direction of the protruding sealing part 42, of the inner preform 14 in FIG. 25A.
Figure 25C:
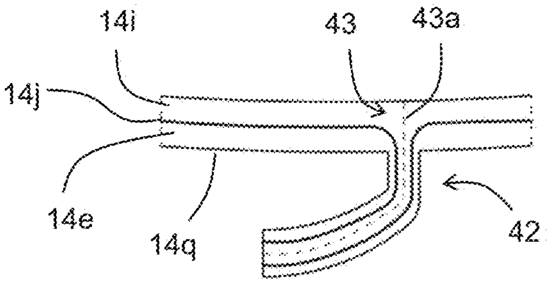
FIG. 25C is an enlarged view of region C in FIG. 25B. In this configuration the protruding sealing part 42 becomes the extension prevention structure without any post-processing.

In the first embodiment, the protruding sealing part 42 that is not bent is formed by direct blow molding, and the protruding sealing part 42 is bent by post-processing to form a bent structure. On the other hand, in this embodiment, as shown in FIG. 25, a bent structure is formed in the protruding sealing part 42 during the direct blow molding of the inner preform 14. Even with such a configuration, the same effect as in the first embodiment prevents the sealing part 43 from being stretched during biaxial stretch blow molding. According to this embodiment, the post-processing can be omitted.

3. Third Embodiment

In the present embodiment, the extension prevention structure is formed by remelting the protruding sealing part 42 after direct blow molding of the inner preform 14 and reducing its surface area. By remelting, the protruding sealing part 42 becomes bulky and its rigidity increases, and hence, it functions as an extension prevention structure.

Figure 26A:
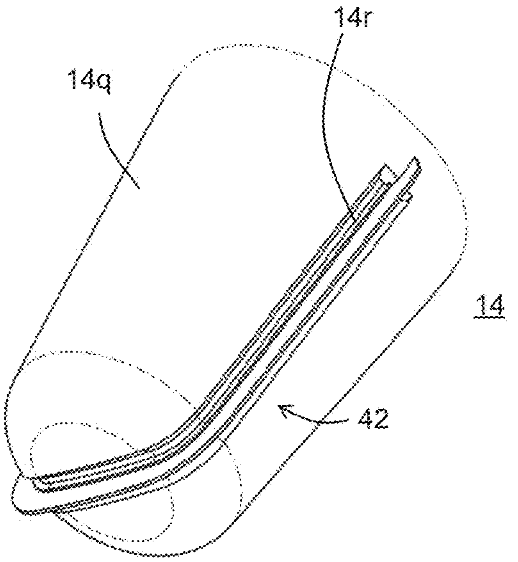
FIG. 26A is a perspective view of the vicinity of the bottom part of the inner preform 14 in the third embodiment of the present invention.
Figure 26B:
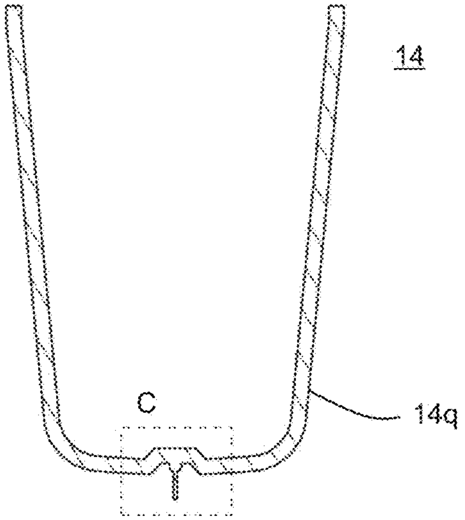
FIG. 26B is a cross-sectional view, perpendicular to the longitudinal direction of the protruding sealing part 42, of the inner preform 14 in FIG. 26A.
Figure 26C:
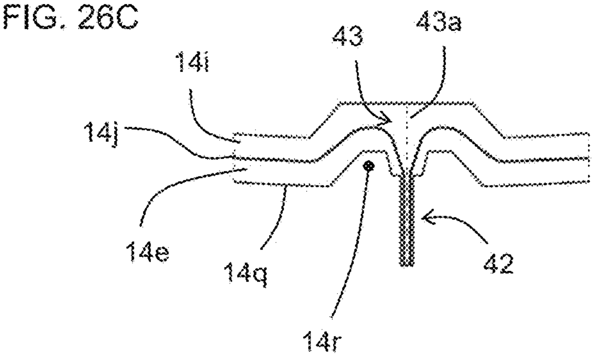
FIG. 26C is an enlarged view of region C in FIG. 26B.
Figure 26D:
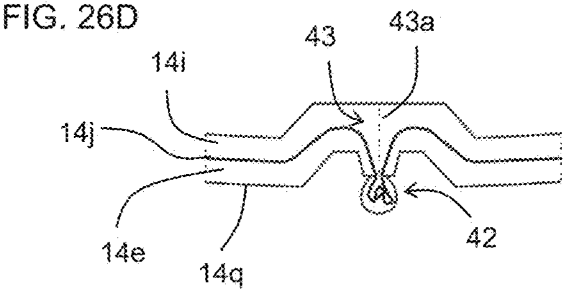
FIG. 26D shows the extension prevention structure, formed by remelting the protruding sealing part 42 in FIG. 26C.
Figure 27A:
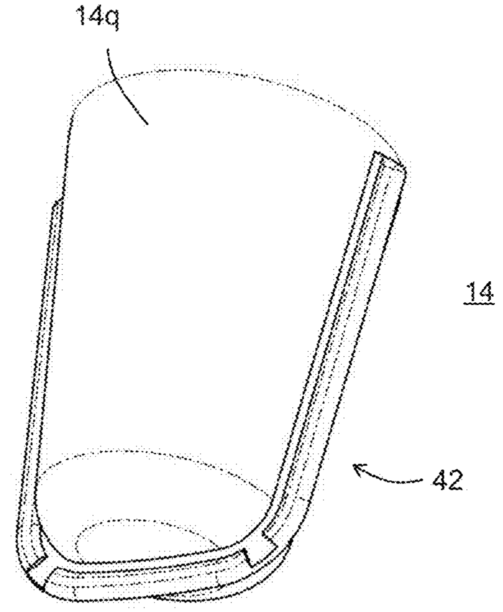
FIG. 27A is a perspective view of the vicinity of the bottom part of the inner preform 14 in the fourth embodiment of the present invention.
Figure 27B:
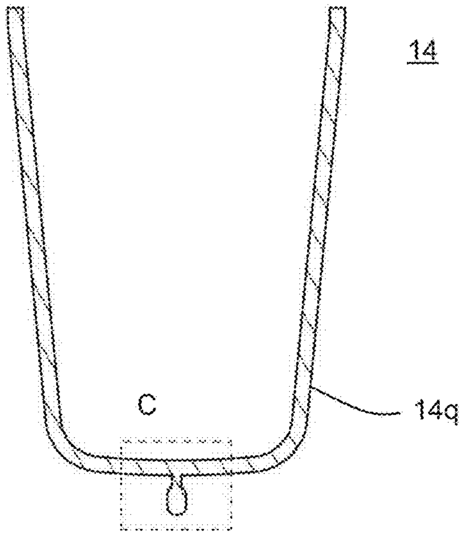
FIG. 27B is a cross-sectional view, perpendicular to the longitudinal direction of the protruding sealing part 42, of the inner preform 14 in FIG. 27A.
Figure 27C:
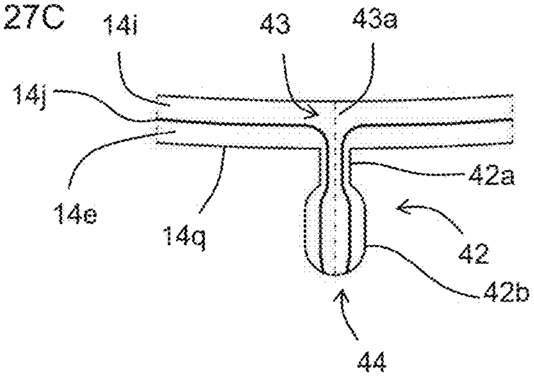
FIG. 27C is an enlarged view of region C in FIG. 27B.
Figure 27D:
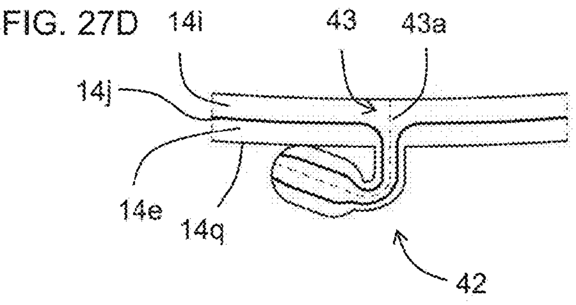
FIG. 27D shows the extension prevention structure, formed by bending the protruding sealing part 42 in in FIG. 27C.
Figure 28A:
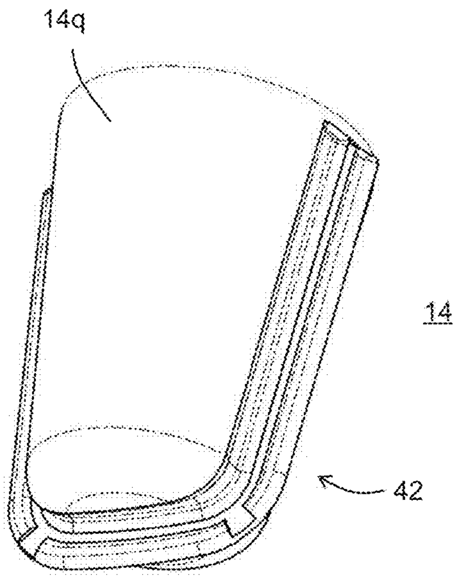
FIG. 28A is a perspective view of the vicinity of the bottom part of the inner preform 14 in the fifth embodiment of the present invention.
Figure 28B:
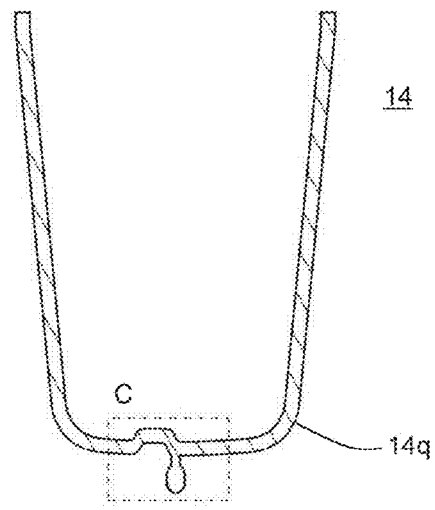
FIG. 28B is a cross-sectional view, perpendicular to the longitudinal direction of the protruding sealing part 42, of the inner preform 14 in FIG. 28A.
Figure 28C:
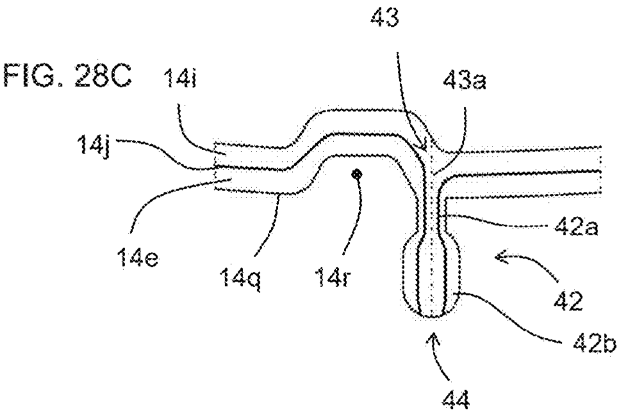
FIG. 28C is an enlarged view of region C in FIG. 28B.
Figure 28D:
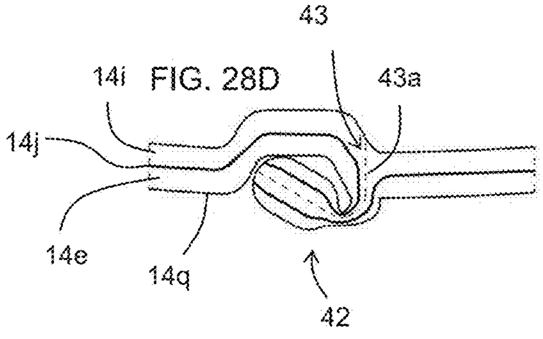
FIG. 28D shows the extension prevention structure, formed by bending the protruding sealing part 42 in FIG. 28C.

Preferably, before remelting, the aspect ratio, which is defined as the height of protruding sealing part 42 divided by the wall thickness of protruding sealing part 42, is 3 or more, and the aspect ratio is reduced by remelting. In other words, in direct blow molding, as shown in FIGS. 26A to 26C, the protruding sealing part 42 is formed in the form of a thin film, and the thin film-shaped protruding sealing part 42 is remelted into a lump. By forming the protruding sealing part 42 in the form of a thin film, the non-barrier area 44 where the gas barrier layer 14*j* is not provided becomes narrower, and in addition, the protruding sealing part 42 becomes easier to remelt.

The wall thickness of the protruding sealing part 42 is, for example, 0.1 to 0.5 mm, preferably 0.1 to 0.3 mm, and specifically, for example, 0.1, 0.2, 0.3, 0.4, 0.5 mm, or may also be set to an arbitrary value between any two of these exemplary values. The height of the protruding sealing part 42 is, for example, 1.0 to 4.0 mm, preferably 1.0 to 3.0 mm, and specifically, for example, 1.0, 1.5, 2.0, 2 . . . 5, 3.0, 3.5, 4.0 mm, or may also be set to an arbitrary value between any two of these exemplary values. The value of the aspect ratio before remelting, and the value of the aspect ratio before remelting minus the aspect ratio after remelting, are each, for example, 3 to 20, and specifically, for example, 3, 4, 5, 6, 7, 8, 9, 10, 11, 12, 13, 14, 15, 16, 17, 18, 19, 20, or may also be set to an arbitrary value between any two of these exemplary values.

It is preferable that the main body part 14*q* is provided with a groove 14*r* along the protruding sealing part 42. In this case, the molten resin produced by remelting can be accommodated in the groove 14*r*.

4. Fourth Embodiment

In this embodiment, as shown in FIG. 27, similarly to the first embodiment, a bent structure is formed by bending the protruding sealing part 42 in post-processing. This embodiment functions as an extension prevention structure through the same effect as in the first embodiment, except that there is no groove 14*r*.

5. Fifth Embodiment

In this embodiment, as shown in FIG. 28, similarly to the first embodiment, a bent structure is formed by bending the protruding sealing part 42 in post-processing. This embodiment functions as an extension prevention structure through the same effect as in the first embodiment.

6. Sixth Embodiment

Figure 29:
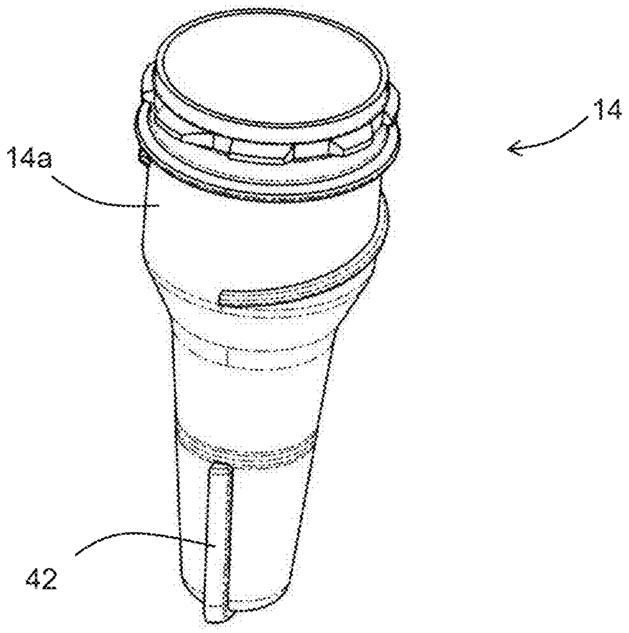
FIG. 29 is a perspective view of the inner preform 14 in the sixth embodiment of the present invention.

As shown in FIG. 29, this embodiment is the same as the first embodiment except that the mouth part 14*a* of the inner preform 14 is longer than that of the first embodiment, and that the shape of the protruding sealing part 42 is that of the second embodiment. By preparing the outer preform 13 and mouth part attachment 8 having dimensions that fit the inner preform 14 of this embodiment, the double container 1 can be manufactured in the same manner as in the first embodiment. In this embodiment, the protruding sealing part 42 may have the configuration of that of the first or third to fifth embodiments.

7. Seventh Embodiment

Figure 30:
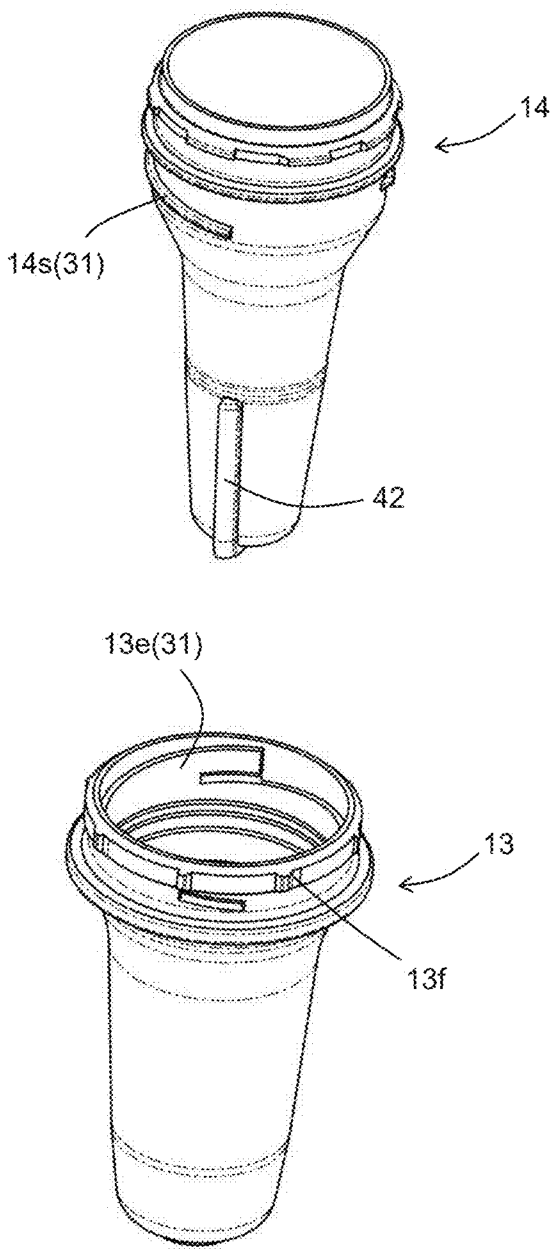
FIG. 30 is a perspective view of the inner preform 14 and the outer preform 13 in the seventh embodiment of the present invention.

As shown in FIG. 30, this embodiment is the same as the first embodiment, except that: a cam mechanism 31 is constituted by a cam protrusion 14*s* provided on the inner preform 14 and a cam rail 13*e* provided on the outer preform 13, and the inner bag 4 moves in the direction of coming out from the container main body 2 by rotation in the loosening direction of left-hand threads; the outer preform 13 is provided with an engaging protrusion 13*f*; and the shape of the protruding sealing part 42 is that of the second embodiment.

The double container 1 can be manufactured in the same manner as in the first embodiment using the mouth part attachment 8 that is compatible with the inner preform 14 and outer preform 13 of this embodiment. The mouth part attachment 8 may be configured to firmly engage with the engaging protrusion 13*f* in the circumferential direction and become unrotatable relative to the outer shell 3. The mouth part attachment 8 may also be configured to engage with the engaging protrusion 13*f* in the circumferential direction to such an extent that it can rotate when the inner plug rotation torque T2, which is described in the first embodiment, is applied. In the former case, a separation band that engages with the engaging protrusion 13*f* is provided on the mouth part attachment 8, and the mouth part attachment 8 can be removed by separating the separation band. In the latter case, the mouth part attachment 8 can be removed by applying a torque equal to or higher than the inner plug rotation torque T2 to the mouth part attachment 8, without an operation such as separating the separation band.

Note that in this embodiment, the protruding sealing part 42 may have the configuration of that of the first or third to fifth embodiments.

8. Other Embodiments

The preform 15 preferably includes a direct blow molded body formed by direct blow molding with a molten tubular parison. In the above embodiment, the preform 15 was formed by covering the inner preform 14 made of a direct blow molded body with the outer preform, but the direct blow molded body itself may be used as the preform 15. In this case, the preform 15 is composed of a direct blow molded body (i.e., composed only of a direct blow molded body). Further, in the above embodiment, the descriptions regarding the inner preform 14 also apply to a preform composed of a direct blow molded body, unless doing so contradicts the scope of the descriptions. Further, in the above embodiment, the descriptions regarding the container main body 2 also apply to a container main body manufactured by biaxially stretch blow molding a preform composed of a direct blow molded body, unless doing so contradicts the scope of the descriptions.

In this case, multi-layering of the preform 15 is easier compared to the case where the preform 15 is formed by injection molding. Containers obtained in this embodiment include single-layer containers, multilayer containers, and laminated peelable containers. A multilayer container is composed of a plurality of layers (two or more layers) that cannot be separated from each other. Preferably, the plurality of layers includes a gas barrier layer. A laminated peelable container is composed of an outer layer and an inner layer that are peelable from each other. The outer layer and the inner layer may each be a single layer or a multilayer. The outer layer and the inner layer can be made peelable from each other by, for example, making the innermost layer of the outer layer a polyolefin layer and the outermost layer of the inner layer an EVOH layer.

Similar to the inner preform 14, in the direct blow molded body, the strength of the sealing part formed by welding the inner surfaces of the tubular parison 34 together may be insufficient. Hence, it is preferable to increase the strength by extending the sealing part from the main body part of the direct blow molded body to form a protruding sealing part. The main body part refers to the parts of the direct blow molded body excluding the protruding sealing part. Moreover, it is preferable to provide an extension prevention structure in the protruding sealing part to prevent the extension of the sealing part during biaxial stretch blow molding.

EXAMPLES

Hereinafter, various examples related to the above embodiments are described.

1. Example 1 (Demonstration of the Effect of the Extension Prevention Structure)

Sample 1

Figure 31:
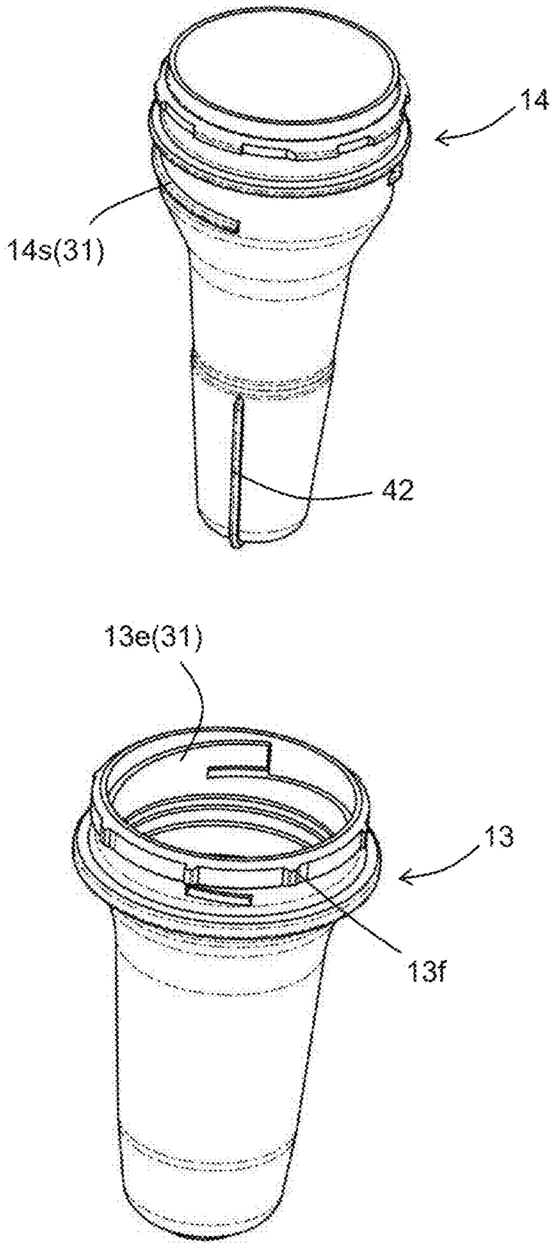
FIG. 31 is a perspective view of the inner preform 14 and the outer preform 13 having the same configuration as the seventh embodiment of the present invention, except that the protruding sealing part 42 does not have an extension prevention structure.

A container main body 2 (capacity 200 mL) having the shape shown in FIG. 2 (however, the mouth part 5 had the shape shown in FIG. 31) was manufactured as Sample 1. Sample 1 was manufactured by forming a preform 15 in which an outer preform 13 shown in FIG. 31 is placed over an inner preform 14 having a protruding sealing part 42 that is not provided with an extension prevention structure as shown in FIG. 31, and then by heating the preform 15 to 110° C., which is the temperature at the center of preform 15 in the height direction, and performing biaxially stretch blow molding.

The inner preform 14 was manufactured by direct blow molding. The layer structure of the inner preform 14 was, in order from the inside, inner layer (i.e., polypropylene, adhesive resin), gas barrier layer (i.e., EVOH), and outer layer (i.e., adhesive resin, polypropylene, (polypropylene containing 5 mass % talc)). The wall thickness of each layer was measured at four points along the circumferential direction (i.e., two points in the parting line direction and two points in the direction perpendicular to the parting line) at the center of the inner preform 14 in the height direction, and the measured values were averaged to obtain the average wall thickness. The wall thickness of each layer was divided by the wall thickness of the entire inner preform 14 to obtain the wall thickness ratio. The results are shown in Table 1.

TABLE 1

| Layer configuration (outer↔inner) | Outer layer PP/Tarc | Outer layer PP | Outer layer Adhesive resin | Gas barrier layer EVOH | Inner layer Adhesive resin | Inner layer PP | Total |
|---|---|---|---|---|---|---|---|
| Average wall thickness (μm) | 155.9 | 260.1 | 68.3 | 130.2 | 35.7 | 127.4 | 777.5 |
| Wall thickness ratio (%) | 20.0 | 33.5 | 8.8 | 16.7 | 4.6 | 16.4 | |

The outer preform 13 was manufactured by performing injection molding on PET (model: titanium catalyst grade, manufactured by Teijin) at 300° C. to form the shape of the outer preform, which was then rapidly cooled to 20° C. The molten PET was turned into an amorphous state by rapid cooling. The outer preform 13 had an average wall thickness of 750 μm at the center in the height direction.

The trunk part of the inner bag 4 of the container main body 2 obtained by biaxial stretch blow molding had a height of 120 mm, and the wall thickness of each layer of the inner bag 4 was measured at eight measurement points at a height of 60 mm from the bottom surface and then the measured values were averaged to obtain the average wall thickness. The wall thickness of each layer was divided by the wall thickness of the entire inner bag 4 to obtain the wall thickness ratio. The results are shown in Table 2.

TABLE 2

| Layer configuration (outer↔inner) | Outer layer PP/Tarc | Outer layer Total of PP and adhesive resin layers | Gas barrier layer EVOH | Inner layer Total of PP and adhesive resin layers | Total |
|---|---|---|---|---|---|
| Average wall thickness (μm) | 17.5 | 36.0 | 15.2 | 17.0 | 85.6 |
| Wall thickness ratio (%) | 20.4 | 42.0 | 17.7 | 19.9 | |

When the inner bag 4 was pulled out from the container main body 2 and the state of the protruding sealing part 42 was examined, it was found that the outer layer and gas barrier layer were torn, and the inner layer was exposed.

Sample 2

The container main body 2 of Sample 2 was manufactured in the same manner as Sample 1, expect that the protruding sealing part 42 having the structure shown in FIG. 28 was formed by direct blow molding, and then the protruding sealing part 42 was bent to form an extension prevention structure to obtain Sample 2.

When the state of the protruding sealing part 42 was examined as was done in Sample 1, no tears were found in the outer layer or gas barrier layer.

2. Example 2 (Demonstration of the Effect of Providing an Uneven Shape on the Outer Surface of the Inner Preform 14)

Sample 3

The container main body 2 of Sample 3 was manufactured in the same manner as Sample 1, except that the inner preform 14 had a single layer structure of polypropylene. The trunk part of the inner bag 4 had a height of 120 mm, and the wall thickness of the inner bag 4 was measured at eight measurement points at each of the height positions that were arranged with a spacing of 10 mm in the height direction. The average wall thickness of the connecting part was the average of the measured values at the center of each of the four connecting parts 2*b*, and the average wall thickness of the corner part was the average of the measured values at the center of each of the four corner parts 2*a*. The average wall thickness was the average of the measured values at eight measurement points. The results are shown in Table 3.

TABLE 3

| Height position (mm) | Average wall thickness of connecting portions (μm) | Average wall thickness of corner portions (μm) | Average wall thickness (μm) |
|---|---|---|---|
| 110 | 136 | 131 | 133 |
| 100 | 122 | 107 | 114 |
| 90 | 114 | 90 | 102 |
| 80 | 103 | 79 | 91 |
| 70 | 102 | 69 | 85 |
| 60 | 107 | 72 | 90 |
| 50 | 118 | 76 | 97 |
| 40 | 129 | 77 | 103 |
| 30 | 108 | 80 | 94 |
| 20 | 100 | 82 | 91 |
| 10 | 95 | 78 | 86 |

When the appearance of the container main body 2 after cooling was examined, it was found that many vertical streaks were formed.

Sample 4

The container main body 2 of Sample 4 was manufactured in the same manner as Sample 3, except that the outer surface of the inner preform 14 was rubbed with #320 sandpaper, after producing the inner preform 14 by direct blow molding, to form an uneven shape on the surface of the inner preform 14. When the appearance of the container main body 2 after cooling was examined, it was found that the inner bag 4 shrunk uniformly and no vertical streaks were formed.

Sample 5

The container main body 2 of Sample 5 was manufactured in the same manner as Sample 3, except that the inner preform 14 was manufactured by direct blow molding using split molds having an uneven shape formed by sandblasting. When the appearance of the container main body 2 after cooling was examined, it was found that slight vertical streaks were formed, but these were much milder than those in Sample 3.

Sample 6

The container main body 2 of Sample 6 was manufactured in the same manner as Sample 3, except that talc, a synthetic silicate, was added at 3 mass % to polypropylene as inorganic particles. When the appearance of the container main body 2 after cooling was examined, it was found that no vertical streaks were formed.

Sample 7

The container main body 2 of Sample 7 was manufactured in the same manner as Sample 3, except that synthetic zeolite was added at 3 mass % as inorganic particles to polypropylene. When the appearance of the container main body 2 after cooling was examined, it was found that no vertical streaks were formed.

3. Example 3 (Demonstration of the Effect of Squeezing Out Inner Bag 4 on Reduction of the Final Residual Amount)

Test No. 1 to 10 were carried out under the conditions shown in Table 4.

Test No. 1

In Test No. 1, the container main body 2 was manufactured under the same conditions as Sample 3, and the contents having the viscosity shown in Table 4 were filled into the container main body 2 in the filling amount shown in Table 4. Thereafter, a cap 8*a* shown in FIG. 1 was attached to the opening 5 of the container main body 2.

Next, the overcap 27 was removed and the container main body 2 was tilted to discharge the contents until no more contents came out, and then the residual amount was measured (i.e., the residual amount after tilting). Next, the inner bag 4 was pulled out from the container main body 2 by rotating the inner plug 26, and the inner bag 4 was squeezed to further discharge the contents (i.e., the residual amount after squeezing).

Test No. 2

Test No. 2 was conducted in the same manner as in Test No. 1, except that the inner preform 14 was formed by the injection molding of PET.

Test No. 3-4 and 7-10

Test No. 3 to 4 and 7 to 10 were conducted in the same manner as in Test No. 1 and 2.

Test No. 5-6

Test No. 5 to 6 were conducted in the same manner as in Test No. 1 and 2, except that, after discharging by tilting, the contents were discharged by lightly tapping the bottom part 7 of the container main body 2 until the contents no longer came out, and then the residual amount was measured (i.e., the residual amount after tapping).

TABLE 4

| Test No. | Viscosity of contents [mPa · sec] | Configuration [Outer shell/ Inner bag] | Filling amount [g] | Residual amount after tilting [g] | Residual amount after tapping [g] | Residual amount after squeezing [g] |
|---|---|---|---|---|---|---|
| 1 | 123 | PET/PP | 183.3 | 4.8 | — | 3.1 |
| 2 | | PET/PET | 187.4 | 10.0 | — | 6.6 |
| 3 | 196 | PET/PP | 199.9 | 12.6 | — | 5.8 |
| 4 | | PET/PET | 190.1 | 14.4 | — | 5.7 |
| 5 | 2140 | PET/PP | 225.7 | 58.1 | 27.0 | 9.7 |
| 6 | | PET/PET | 209.3 | 49.7 | 19.8 | 11.9 |
| 7 | 204 | PET/PP | 233.3 | 10.5 | — | 3.6 |
| 8 | | PET/PET | 219.9 | 10.3 | — | 5.1 |
| 9 | 435 | PET/PP | 231.5 | 19.8 | — | 3.7 |
| 10 | | PET/PET | 219.0 | 16.9 | — | 5.7 |

In all of Test No. 1 to 10, the final residual amount was reducible by squeezing out the inner bag 4. No. Comparison between Test No. 1 and Test No. 2 showed that the residual amount after squeezing in Test No. 1, in which the inner bag 4 was made of highly flexible PP, was smaller than that in Test No. 2. Furthermore, an increase in the viscosity significantly increased the residual amount after tilting, whereas the residual amount after squeezing did not increase as much as the residual amount after tilting due to an increase in viscosity.

1: dual container, 2: container main body, 2*a*: corner part, 2*b*: connecting part, 2*c*: bent shape 3: outer shell, 3*a*: open end, 31: cam rail, 3*m*: engaging recess, 3*n*: engaging protrusion, 4: inner bag, 4*c*: protrusion, 4*c*1: protruding tube, 4*c*2: engaging protrusion, 4*c*3: tapered surface, 4*c*4: abutting flange, 4*c*5: annular protrusion, 4*c*6: bottom surface, 4*c*7: bottom surface, 4*c*8: tapered surface, 4*d*: inner bag main body, 4*e*: outer layer, 4*e*1: outermost layer, 4*e*2: adhesive layer, 4*g*: cam protrusion, 4*h*: engaging protrusion, 4*i*: inner layer, 411: innermost layer, 412: repro layer, 413: adhesive layer, 4*j*: gas barrier layer, 4*k*: enlarged diameter structure, 41: open end, 4*m*: engaging part, 4*q*: main body part, 5: mouth part, 5*b*: flange, 5*c*: open end, 6: trunk part, 6*b*: shoulder part, 6*c*: trunk part main body, 7: bottom part, 7*a*: recess, 8: mouth part attachment, 8*a*: cap, 13: outer preform, 13*a*: mouth part, 13*b*: trunk part, 13*c*: bottom part, 13*d*: annular protrusion, 13*e*: cam rail, 13*f*: engaging protrusion, 14: inner preform, 14*a*: mouth part, 14*b*: trunk part, 14*c*: bottom part, 14*d*: protrusion, 14*e*: outer layer, 14*i*: inner layer, 14*j*: gas barrier layer, 141: enlarged diameter structure, 14*m*: engaging part, 14*n*: abutting flange, 140: open end, 14*p*: burr, 14*q*: main body part, 14*r*: groove, 14*s*: cam protrusion, 15: preform, 15*a*: mouth part, 15*b*: trunk part, 15*c*: bottom part, 26: inner plug, 27: overcap, 27*a*: outer tube, 27*b*: intermediate tube, 27*c*: inner tube, 27*d*: top plate, 27*e*: knurl, 27*f*: female threaded part, 28: main body part, 28*a*: outer tube, 28*b*: inner tube, 28*c*: annular protrusion, 28*d*: engaging protrusion, 28*e*: top plate, 28*f*: discharging tube, 28*g*: mounting tube, 28*h*: male threaded part, 28*i*: knurl, 30: connecting part, 31: cam mechanism, 32: opening part, 32*a*: engaging tube, 33: shrink film, 33*a*: easy-to-tear line, 33*b*: easy-to-tear line, 33*c*: upper part, 33*d*: lower part, 34: tubular parison, 35: split mold, 35*a*: pinch-off part, 36: split mold, 36*a*: pinch-off part, 38: molded body, 39: burr, 40: bag part, 41: annular recess, 41*a*: annular protrusion, 42: protruding sealing part, 42*a*: base part, 42*b*: outer part, 42*b*1: thick wall part, 42*b*2: thin wall part, 43: sealing part, 43*a*: sealing surface, 44: non-barrier area.

The invention claimed is:

1. A method for manufacturing a container, comprising:

a step of manufacturing a container main body by performing biaxial stretch blow molding on a preform, wherein the preform includes a direct blow molded body formed by performing direct blow molding on a molten tubular parison;

the direct blow molded body is provided with a protruding sealing part in which a sealing part, formed by welding inner surfaces of the tubular parison to each other, protrudes from a main body part of the direct blow molded body, and the protruding sealing part includes an extension prevention structure.

2. The method of claim 1, wherein the preform is composed of the direct blow molded body.

3. The method of claim 1, wherein the preform comprises an inner preform, being composed of the direct blow molded body, and an outer preform disposed to cover the inner preform.

4. The method of claim 3, wherein the extension prevention structure is a bent structure in which the protruding sealing part is bent.

5. The method of claim 4, wherein the bent structure is formed during the direct blow molding.

6. The method of claim 4, wherein the bent structure is formed by bending the protruding sealing part after the direct blow molding.

7. The method of claim 6, wherein a main body part of the inner preform includes a groove along the protruding sealing part.

8. The method of claim 6, wherein the protruding sealing part includes a base part and an outer part in order from the main body part's side; and the outer part includes a part having a larger wall thickness than the base part.

9. The method of claim 8, wherein the protruding sealing part is disposed over a bottom part of the main body part and a trunk part of the main body part;

the outer part includes a thick wall part and a thin wall part having a smaller wall thickness than the thick wall part; and the thin wall part is disposed adjacent to a boundary between the bottom part and the trunk part.

10. The method of claim 3, wherein the extension prevention structure is formed by reducing surface area of the protruding sealing part by remelting the protruding sealing part after the direct blow molding.

11. The method of claim 10, wherein an aspect ratio, defined by a height of the protruding sealing part divided by a wall thickness of the protruding sealing part, is three or more before the remelting, and the aspect ratio is reduced by the remelting.

12. The method of claim 10, wherein the main body part includes a groove along the protruding sealing part.

13. The method of claim 3, wherein the inner preform includes, in order from inside of the inner preform, an inner layer, a gas barrier layer, and an outer layer.

14. A method for manufacturing a double container, comprising:

a step of producing a container main body having an inner bag and an outer shell covering the inner bag, by performing biaxial stretch blow molding on a preform having an inner preform and an outer preform disposed to cover the inner preform, wherein the inner preform is formed by performing direct blow molding on a molten tubular parison;

a mouth part of the inner preform includes an engaging part for pulling out the inner bag from the container main body; and ratio of D2 to D1 is 0.35 or more, where D1 is largest outer diameter of the inner preform at the mouth part, D2 is an outer diameter of the inner preform at a height of 0.1H from a bottom part of the inner preform, and H is a total height of the inner preform.

15. The method of claim 14, wherein the ratio of D2 to D1 is 0.5 or more.

16. The method of claim 14, wherein the ratio of D2 to D3 is 1.4 or more, where D3 is an outer diameter of the tubular parison.

17. The method of claim 14, wherein the inner preform includes a protruding sealing part formed by welding inner surfaces of the tubular parison to each other and the protruding sealing part protrudes from a main body part of the inner preform; and the protruding sealing part is disposed over a bottom part of the main body part and a trunk part of the main body part.

18. A method for manufacturing a double container, comprising:

a step of producing a container main body having an inner bag and an outer shell covering the inner bag, by performing biaxial stretch blow molding on a preform having an inner preform and an outer preform disposed to cover the inner preform, wherein the inner preform is formed by performing direct blow molding on a molten tubular parison;

the inner bag includes a thin wall part with a wall thickness of 100 μm or less; and the inner preform is provided with an uneven shape or a lubricant on an outer surface of an area that includes a part corresponding to the thin wall part.

19. The method of claim 18, wherein the uneven shape includes a random shape.

* * * * *